United States Patent
Miller et al.

(10) Patent No.: US 10,535,982 B2
(45) Date of Patent: *Jan. 14, 2020

(54) METER SOCKET ADAPTER WITH INTEGRAL AUTOMATIC TRANSFER SWITCH

(71) Applicant: Briggs & Stratton Corporation, Wauwatosa, WI (US)

(72) Inventors: Michael Miller, Lake Mills, WI (US); Gary Gracyalny, Elm Grove, WI (US); David A. Kratz, Brookfield, WI (US); Richard Gilpatrick, Whitewater, WI (US); Dean Weigand, Waukesha, WI (US); Sie Teong Lim, Brookfield, WI (US); Nicholas Demos, Wauwatosa, WI (US)

(73) Assignee: Briggs & Stratton Corporation, Wauwatosa, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/041,913

(22) Filed: Jul. 23, 2018

(65) Prior Publication Data

US 2018/0331512 A1 Nov. 15, 2018

Related U.S. Application Data

(63) Continuation of application No. 15/449,090, filed on Mar. 3, 2017, now Pat. No. 10,038,310, which is a (Continued)

(51) Int. Cl.
*H02B 1/03* (2006.01)
*H01H 9/54* (2006.01)
*H02B 1/015* (2006.01)
*H02B 1/24* (2006.01)
*H02B 1/30* (2006.01)

(52) U.S. Cl.
CPC ............... *H02B 1/03* (2013.01); *H01H 9/54* (2013.01); *H02B 1/015* (2013.01); *H02B 1/24* (2013.01); *H02B 1/30* (2013.01)

(58) Field of Classification Search
None
See application file for complete search history.

(56) References Cited

U.S. PATENT DOCUMENTS 3,643,209 A 2/1972 Coston
3,654,484 A 4/1972 Jorgenson et al.
(Continued)

*Primary Examiner* — Courtney L Smith
(74) *Attorney, Agent, or Firm* — Foley & Lardner LLP

(57) ABSTRACT

A transfer switch and load controller that can be plugged into an existing utility meter socket and electrically positioned between the meter socket and a distribution panel to allow switching between utility power and standby power. The plug-in transfer switch functions to transfer the power supplied to a home between the utility power source and the generator power source upon loss of power from the utility power source. The transfer switch components are contained in an enclosed housing of a meter socket adapter that is mounted directly to the meter socket of a meter housing. The meter socket adapter is prewired to a standby generator such that the standby generator can be connected to a home power system by plugging the meter socket adapter into the meter socket.

12 Claims, 31 Drawing Sheets

Related U.S. Application Data continuation of application No. 14/447,839, filed on Jul. 31, 2014, now Pat. No. 9,620,305.

(60) Provisional application No. 61/860,486, filed on Jul. 31, 2013, provisional application No. 61/892,773, filed on Oct. 18, 2013.

(56) References Cited

U.S. PATENT DOCUMENTS

| | | | |
|---|---|---|---|
| 4,258,968 A | 3/1981 | Holt | |
| 5,268,850 A | 12/1993 | Skoglund | |
| 5,790,369 A | 8/1998 | Sitler | |
| 6,074,246 A | 6/2000 | Seefeldt et al. | |
| 6,107,701 A | 8/2000 | Flegel | |
| 6,163,449 A | 12/2000 | Flegel | |
| 6,172,432 B1 | 1/2001 | Schnackenberg et al. | |
| 6,188,145 B1 | 2/2001 | Stewart | |
| 6,365,990 B2 | 4/2002 | Flegel | |
| 6,376,937 B1 | 4/2002 | Stewart | |
| 6,414,240 B1 | 7/2002 | Flegel | |
| 6,420,801 B1 | 7/2002 | Seefeldt | |
| 6,545,374 B1 | 4/2003 | Allenbach | |
| 6,784,385 B2 | 8/2004 | Hernandez-Perez | |
| 6,956,733 B2 | 10/2005 | Besley III et al. | |
| 7,019,666 B2 | 3/2006 | Tootoonian Mashhad et al. | |
| 7,030,514 B2 | 4/2006 | Wareham et al. | |
| 7,397,652 B2 | 7/2008 | Price et al. | |
| 7,683,603 B1 | 3/2010 | Lathrop et al. | |
| 8,288,890 B2 | 10/2012 | Young | |
| 8,292,658 B2 | 10/2012 | Sullivan et al. | |
| 8,368,386 B2 | 2/2013 | Reineccius | |
| 9,620,305 B2 | 4/2017 | Miller et al. | |
| 10,038,310 B2 * | 7/2018 | Miller | H02B 1/03 |
| 2002/0171436 A1 | 11/2002 | Miles | |
| 2003/0034693 A1 * | 2/2003 | Wareham | H02J 9/06 307/23 |
| 2003/0075982 A1 | 4/2003 | Seefeldt | |
| 2004/0036362 A1 * | 2/2004 | Beck | H01H 21/42 307/125 |
| 2006/0138868 A1 | 6/2006 | Wareham et al. | |
| 2008/0061629 A1 | 3/2008 | Plahn | |
| 2009/0150100 A1 | 6/2009 | Pier et al. | |
| 2010/0181177 A1 * | 7/2010 | Young | H01H 19/38 200/336 |
| 2010/0207448 A1 * | 8/2010 | Cooper | H02J 3/14 307/20 |
| 2010/0225305 A1 | 9/2010 | Reineccius | |
| 2011/0004357 A1 * | 1/2011 | Mathiowetz | H02J 3/14 700/295 |
| 2011/0175453 A1 * | 7/2011 | Batzler | H02J 9/06 307/68 |
| 2012/0074794 A1 * | 3/2012 | Morales | G06F 1/26 307/147 |
| 2013/0106397 A1 | 5/2013 | Fulton et al. | |
| 2014/0042809 A1 * | 2/2014 | Lim | H02J 9/04 307/23 |
| 2014/0088780 A1 | 3/2014 | Chen | |

* cited by examiner

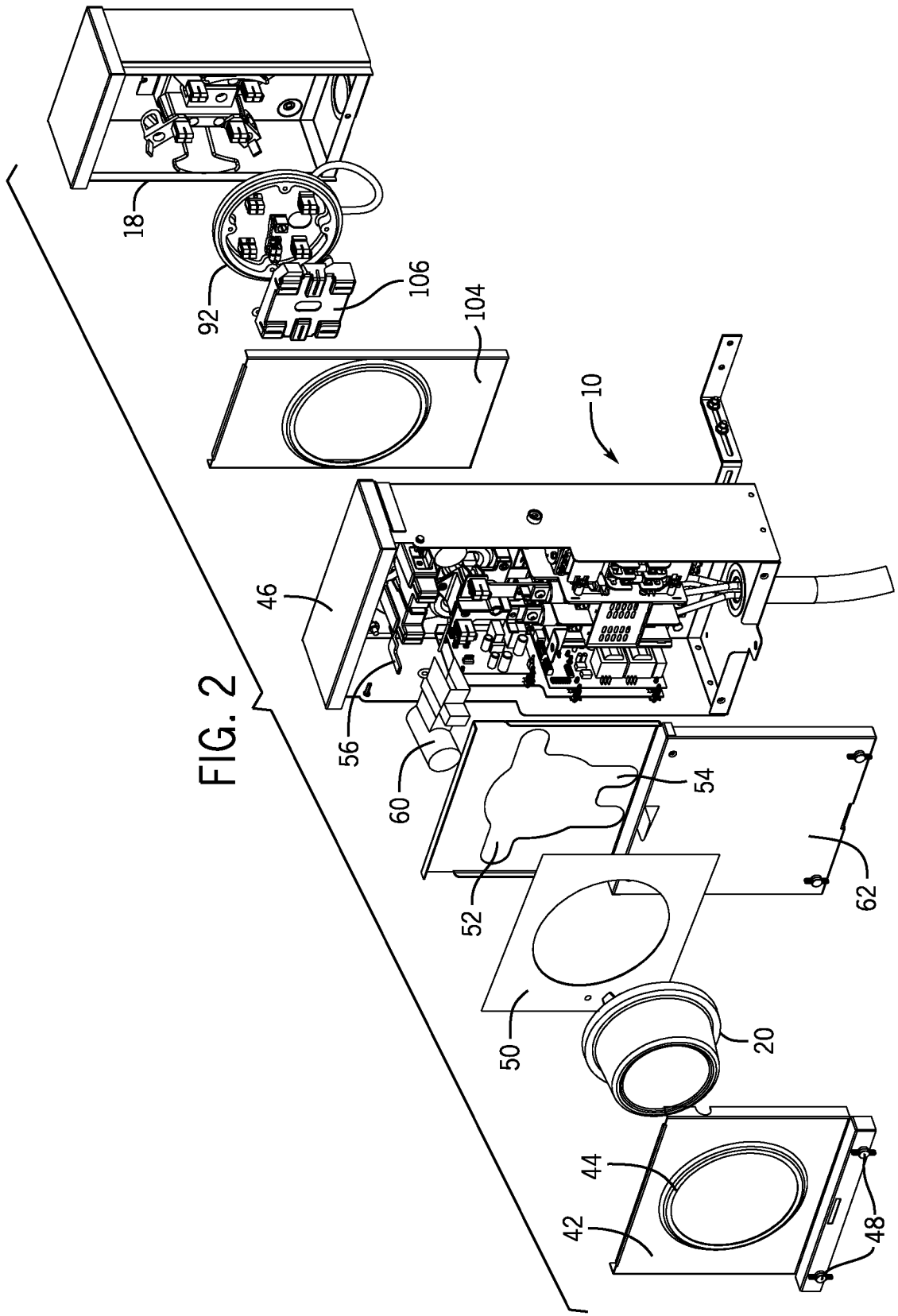

METER SOCKET ADAPTER WITH INTEGRAL AUTOMATIC TRANSFER SWITCH

CROSS-REFERENCE TO RELATED APPLICATION

The present application is a continuation of U.S. patent application Ser. No. 15/449,090, filed Mar. 3, 2017, which is a continuation of U.S. patent application Ser. No. 14/447,839, filed Jul. 31, 2014, which is based on and claims priority to U.S. Provisional Application Ser. No. 61/860,486, filed on Jul. 31, 2013 and U.S. Provisional Application Ser. No. 61/892,773, filed on Oct. 18, 2013, the disclosures of which are both incorporated herein by reference.

BACKGROUND

The present disclosure generally relates to the field of building electrical systems and more specifically to building electrical systems including utility power sources and standby power sources. Standby power systems are generally configured to provide backup power to electrical loads in the event of a utility power failure. The transfer between the utility power source and the standby power source (such as a generator, engine driven generator, battery backup, solar or alternate energy source) is facilitated by an automatic transfer switch.

Presently, the transfer of the power supply from the utility source to the standby power source is carried out by a transfer switch that is positioned in a location between an existing utility meter housing and a distribution panel. The existing utility meter housing includes a meter socket that receives an electricity meter for measuring the amount of electricity consumed by the home or business. In typical installations, the transfer switch is mounted at or near either the utility meter housing or at or near the distribution panel. The installation of the transfer switch is a complicated process, often including isolation of the ground wires from the neutral wires within the distribution panel (breaker box), and relocation of the neutral-ground bonding point. Electrical codes require that all neutrals in a house or building electrical system be bonded to ground at the closest point to the service entrance disconnect. Accordingly, when installing a transfer switch into an existing house between the utility meter housing and the distribution panel, an electrician will have to isolate the ground wires and neutral wires in the electrical distribution panel to their individual terminal strips and connect them to the corresponding ground and neutral terminals within the transfer switch panel. Once complete, the electrician will then be required to relocate the neutral-ground bonding point from its previous location (within the distribution panel) to the transfer switch panel as this is now the closest panel to the service entrance disconnect. This can be a time consuming process. The time required to install a transfer switch between the utility meter housing and the distribution panel can be between 2 and 4 hours and requires trained electricians, which can be costly for the home or business owner.

SUMMARY

The present disclosure relates to a transfer switch that can be plugged into an existing utility meter socket and thus electrically positioned between the meter socket and a distribution panel to allow switching between utility power and standby power. The plug-in transfer switch functions to transfer the power supplied to a home between the metered utility power source and the generator power source upon loss of power from the utility power source.

The present disclosure simplifies the installation procedure required for a typical transfer switch, reduces the amount of time required to install the transfer switch, and minimizes labor costs by providing a standby generator that basically plugs into the house at the utility meter. The present disclosure provides an electrical plug-in solution. In addition, the present disclosure allows the transfer switch and standby generator to be more easily moved from one home to another, such as when the homeowner moves and desires to take the standby generator along to the new home.

The present disclosure includes a unique electrical adapter that plugs into the utility meter socket. The adapter is hard wired to an integrated transfer switch originally conceived to be factory-installed at and prewired to the generator or disconnect box. The disclosure provides an integrated transfer switch in the same housing with the contact blades, which eliminates an expensive disconnect and provides a stronger likelihood of maintaining the current bonding point at the home load center. Various other features, objects and advantages of the invention will be made apparent from the following description taken together with the drawings.

Various other features, objects and advantages of the invention will be made apparent from the following description taken together with the drawings.

BRIEF DESCRIPTION OF THE DRAWINGS

The drawings illustrate the best mode presently contemplated of carrying out the disclosure. In the drawings:

FIG. 2 is an exploded view of the meter socket adapter including a transfer switch shown in FIG. 1;

DETAILED DESCRIPTION

Figure 1:
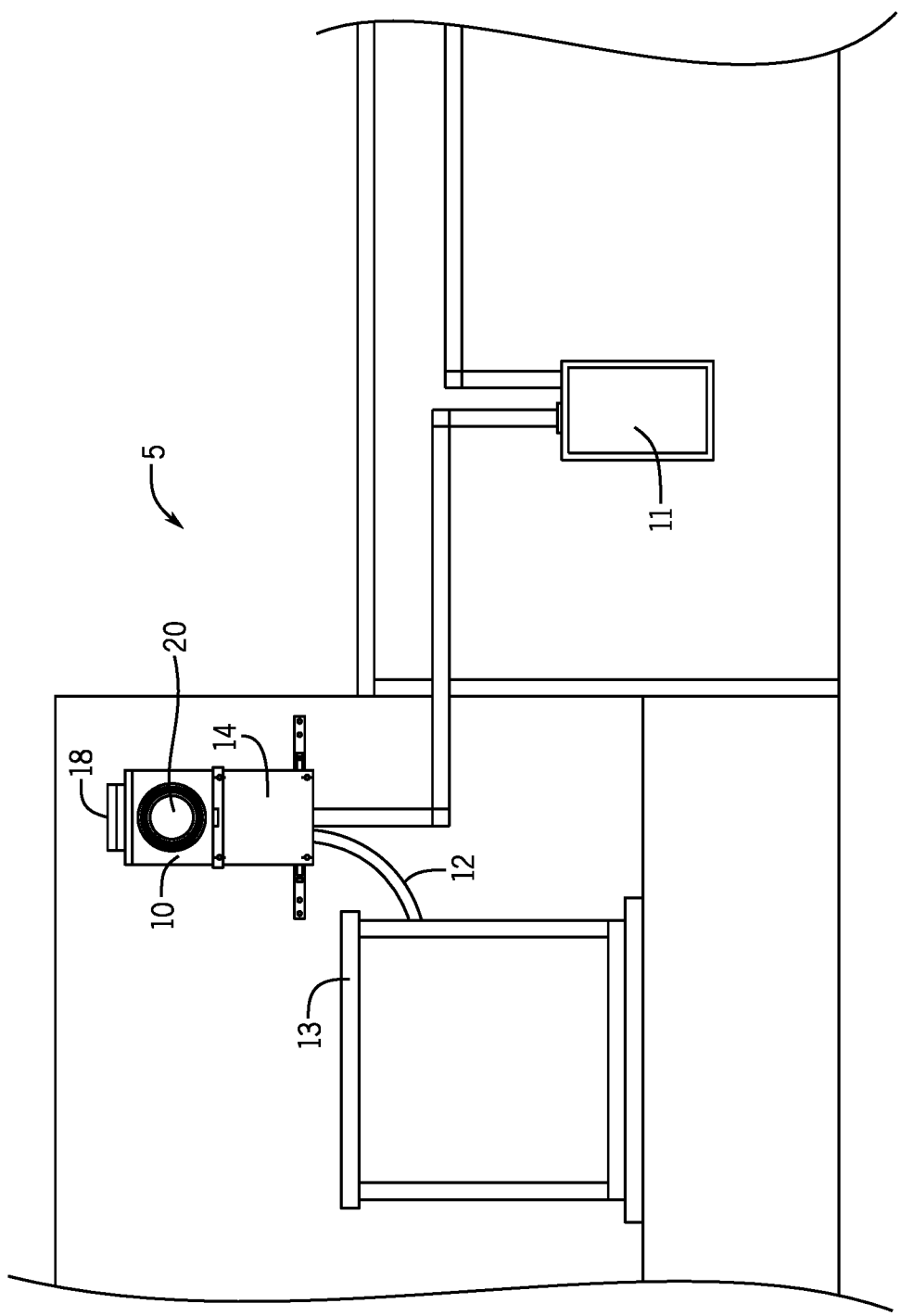
FIG. 1 is a perspective view illustrating the mounting of the transfer switch with a meter socket adapter to an existing utility meter socket between a standby generator and a distribution panel

FIG. 1 illustrates an electrical system 5 for a building (e.g., a home electrical system) according to an exemplary embodiment. Electrical system 5 includes an electric meter housing 18 that encloses a contact block that is electrically coupled to an off-site utility power source (not shown) and configured to provide power from the off-site utility source through an electricity meter 20 to a distribution or panel 11. Distribution panel 11 (e.g., a circuit breaker box, a fuse box, etc.) is configured to route electrical power to electrical loads (not specifically shown in FIG. 1) in the building. Electrical system 5 also includes a generator 13 (e.g. a home standby generator) for providing electrical power to distribution panel 11 instead of (or potentially in addition to) the utility power provided through the meter housing 18. For example, generator 13 may be configured to provide power to distribution panel 11 through a transfer switch in the event of a utility power failure. According to various exemplary embodiments, generator 13 may be a standby generator, a portable generator, or any generator capable of providing power to a distribution panel of a building. Generator 13 may be an engine driven electrical generator that uses natural gas, propane, diesel or gasoline as a fuel. Alternatively, standby generator may be a battery backup system, fuel cell power source, solar power system, wind or other alternative energy source, or any other on-site power source.

The electrical system 5 includes a meter socket adapter 10 that is positioned between the meter housing 18 and the distribution panel 11. The meter socket adapter 10 includes an internal transfer switch controller and contacts to control the supply of power to the electric loads from either the utility or generator. The meter socket adapter 10 is hard wired to the on-site power source, such as a standby generator 13, through a pre-wired cable 12. The factory installed cable 12 can be a 25-foot, 50-foot or any other desired length cable that connects to the standby generator 13 or disconnect box in a known manner. The cable 12 enters into the outer housing 14 to provide power to a set of internal contacts that allows the transfer switch components of the meter socket adapter 10 to switch to power from the standby generator when the utility-side power is interrupted. The outer housing 14 is preferably made of metal, such as steel or aluminum. However, other materials, such as a durable composite, are contemplated as being a viable alternative.

As can be seen in FIG. 2, the meter socket adapter 10 is plugged into a meter socket formed as part of the conventional meter housing 18. The meter housing 18 is conventionally mounted on the exterior of a home or on the interior of a building. The meter housing 18 typically receives an existing electricity meter 20 through the interaction between contact blades on the back surface of the electricity meter 20 and receiving jaws formed within the meter socket. The meter socket adapter 10 of the present disclosure is positioned between the meter socket housing 18 and the electricity meter 20.

In the embodiment illustrated, the meter socket adapter 10 is formed as a component that can be received in an existing meter socket 16, such as when the meter socket adapter 10 is being used with an existing home. However, if the meter socket adapter is being installed at a new home construction, the meter socket adapter 10 and the meter socket 16 could be combined into a single unit. Such embodiment would be useful during new home construction and would eliminate the need for a separate meter socket.

Figure 3A:
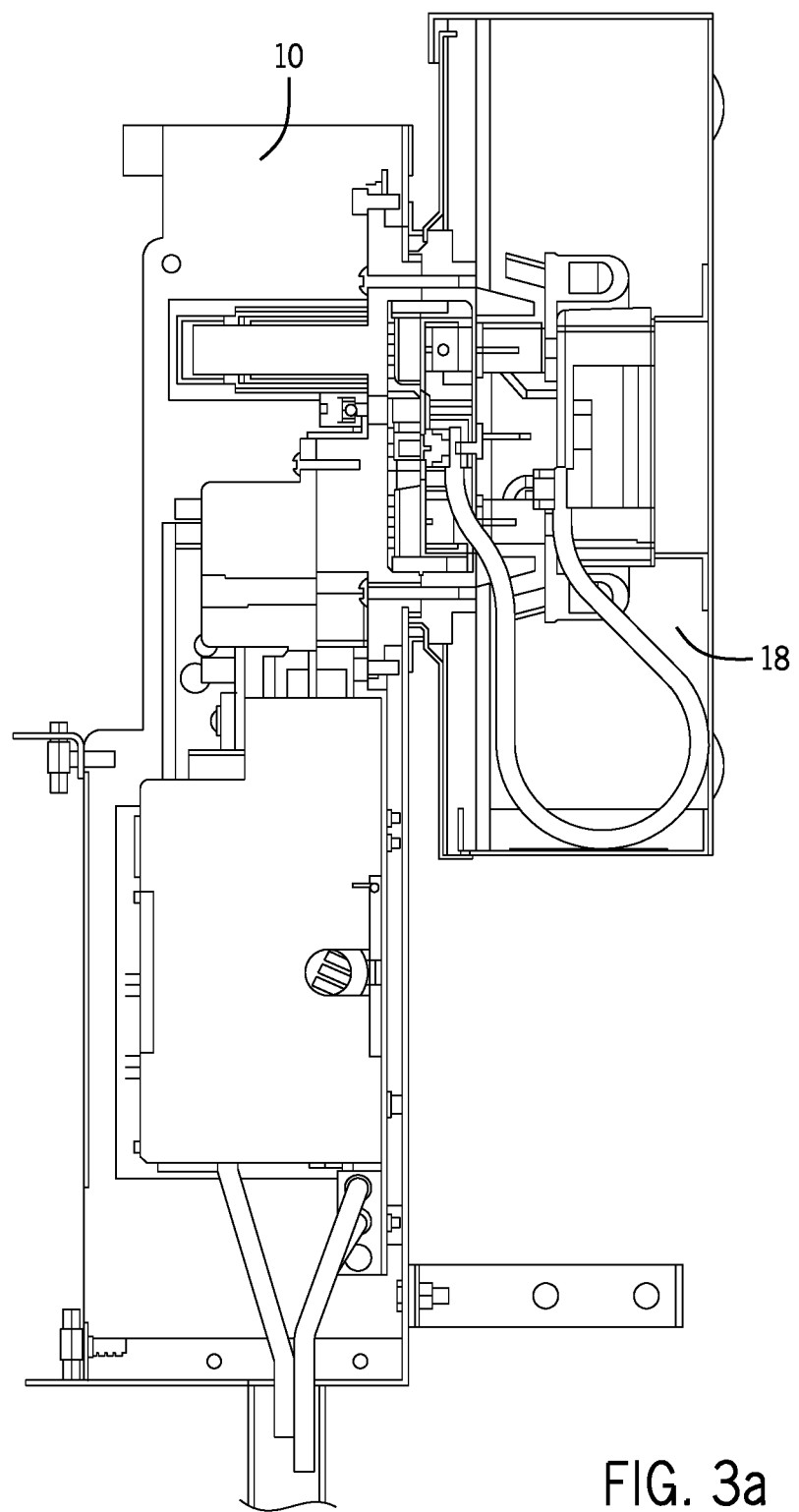
FIG. 3(a) is a sectional side view illustrating the mounting arrangement shown in FIG. 1.
Figure 3B:
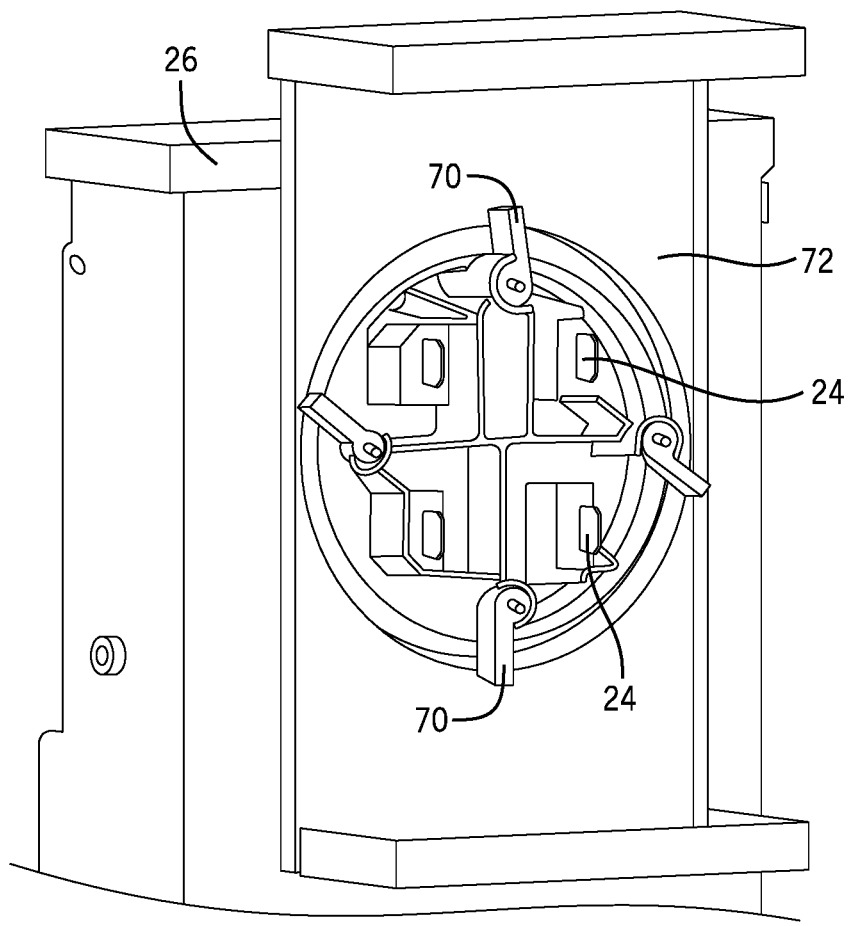
FIG. 3(b) is a back view of the attachment mechanism used to hold the meter socket adapter to the meter socket.
Figure 3C:
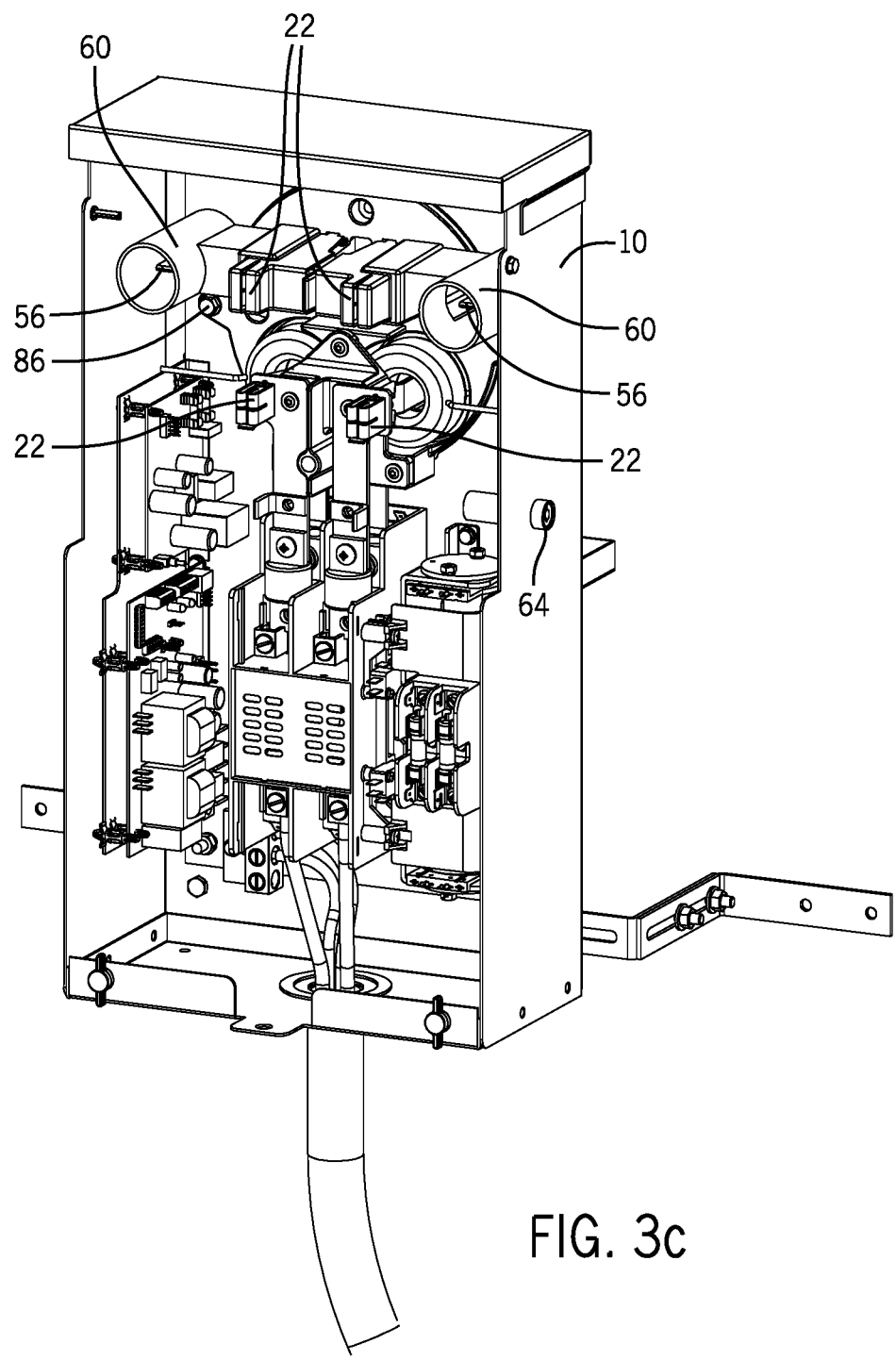
FIG. 3(c) is a front view showing the contact jaws within the meter socket adapter as well as the operational components for the transfer switch.
Figure 4:
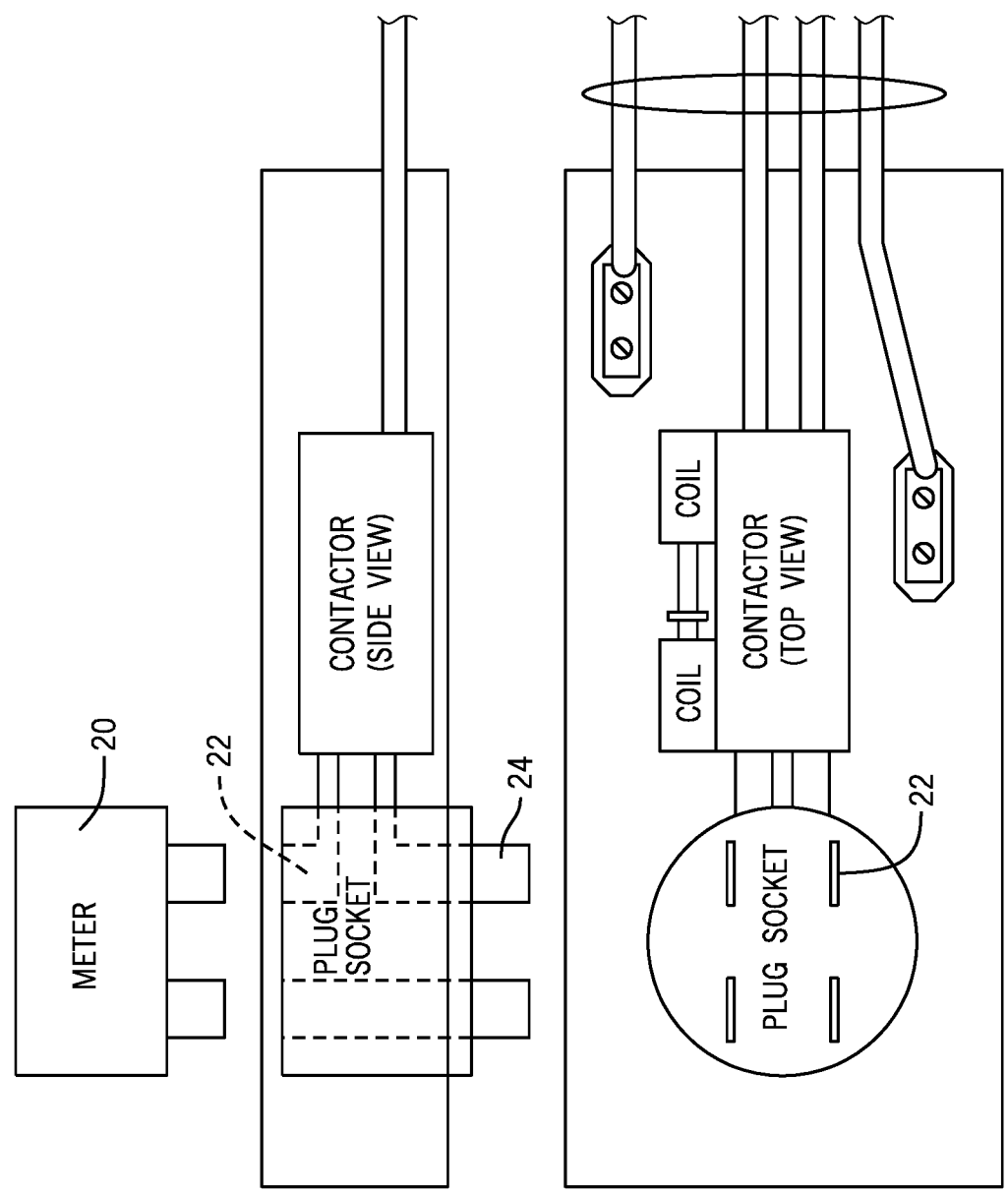
FIG. 4 is a schematic illustration showing the interaction between the electricity meter and the meter socket adapter.

As illustrated in FIGS. 3c and 4, the meter socket adapter 10 includes four spaced contact jaws 22 that each receives a contact blade formed on the back of the electricity meter in a conventional orientation. The contact jaws 22 are electrically connected to contact blade 24 that extend from the back surface 26 of the meter socket adapter 10, as shown in FIG. 3(b). The contact blades 24 are received within corresponding contact jaws formed in the meter socket. In this manner, the meter socket adapter 10 can plug right into the meter socket 16 of the meter housing 18 while the electricity meter 20 can then plug directly into the contact jaws 22 formed as part of the meter socket adapter.

The electrical contact blades 24 provided on the meter socket adapter 10 plugs into the contact jaws and provide an electrical path between the utility supply-side bus bar and the home load-side bus bar of the meter socket. Typically, four contact blades are used, two for each side. The outer housing 14 of the meter socket adapter 10 encloses automatic transfer switch contacts and a transfer switch controller that first senses when utility power has been lost and secondarily switches the power supply from the utility source to the on-site power source (standby generator). The meter socket adapter 10 provides a much simpler, faster and cost-effective generator installation.

In the embodiment illustrated, the meter socket adapter has 200 amp utility service switching capability and up to 200 amp on-site power source switching capability. In alternative embodiments, the meter socket adapter can have larger or smaller switching capabilities (e.g., 100 amp, 400 amp, etc.). In the exemplary embodiment, the transfer switch includes a load sensor (current transformer) on the load-side of the adapter plug. Alternatively, the current transformer could be mounted on the generator side. This sensor detects the power being used by the loads by measuring the current flow to the loads. Preferably, one load sensor is on each power conductor feeding the distribution panel.

In addition to the transfer switch controller, the meter socket adapter 10 also includes load management controls contained inside the outer housing 14. The load management controls communicate to load relays that are located in series with electric loads at the home or business. To prevent a generator overload, wired or wireless communications can be used to activate the load relays to provide load shedding capabilities.

Although the load management controls and load sensing components are shown within the meter socket adapter 10, these two elements could be installed inside the home in a separate enclosure mounted near the distribution panel and could also contain the load shedding relays. Alternatively, load management may not be used at all if the standby power source is large enough or if it is not required by code. Further, it is contemplated that the load management controller could be located at the generator and thus removed from within the meter socket adapter 10.

The load management controller contained within the outer housing 14 functions to selectively shed loads from the power distribution system and subsequently reconnect the loads to the power distribution system depending upon the amount of power drawn by the loads and the power available from the standby power source. The details of the load management control board can vary depending upon the particular power distribution system. The details of one exemplary load management controller and its method of operation are set forth in U.S. Pat. No. 8,415,830, the disclosure of which is incorporated herein by reference. However, other types of load management systems and methods of operation are contemplated as being within the scope of the present disclosure. The load management controller is contained within the housing such that both the transfer switch and the load management components required to selectively shed/reconnect loads within the home serviced by the generator can be installed as a single device contained within the housing.

The meter socket adapter 10 includes over-current protection devices that are hard wired between the utility power supply and the transfer switch. Preferably, these over-current protection devices are devices with high current interrupting capacity (AIC) typically in the range of 22,000-25,000 amps or more. One example of a high current interrupting device is a fuse. The transfer switch includes a two-pole form-C transfer switch that provides "break-before-make" operation when switching between power sources of utility and on-site standby power. The transfer switch can be of any type, such as one that uses solenoid actuation to automatically open and close the contacts. Alternatively, two separate 2-pole A-form (or B-form) switches could be utilized to select the power source (utility or generator) to be provided to the load. Doing so requires inter-lock circuitry to provide "break-before-make" operation and to prevent both switches from being closed at any one time. An alternative inter-lock can also be done via software.

Figure 5:
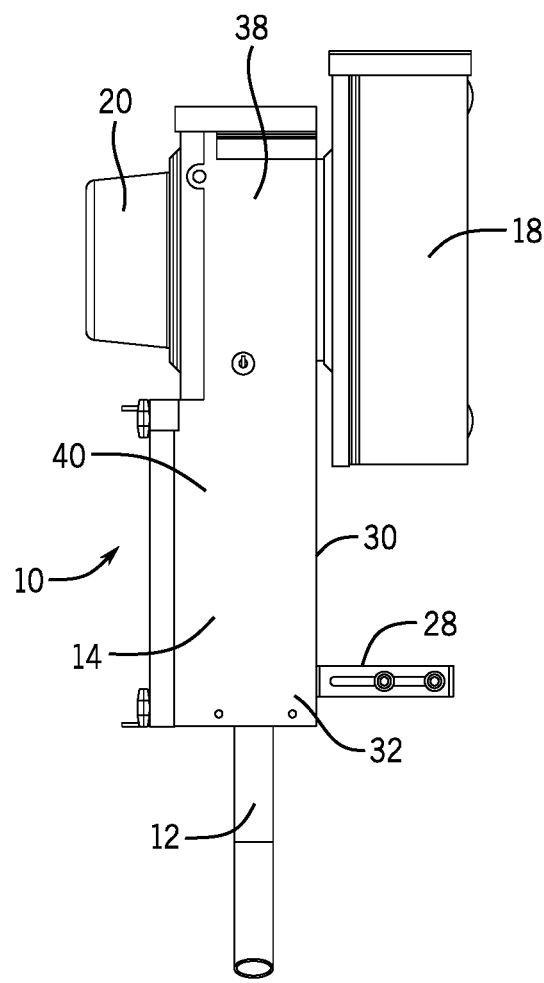
FIG. 5 is a side view showing the mounting of the meter socket adapter to the utility meter socket.
Figure 6:
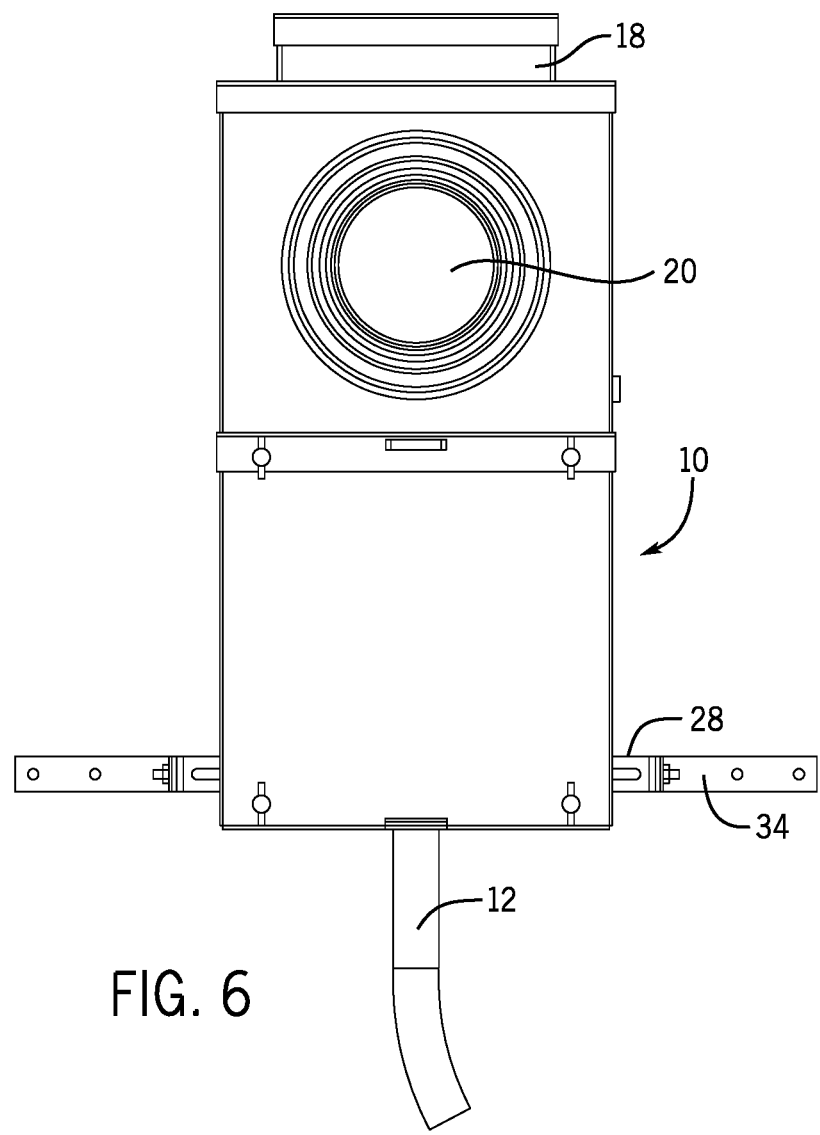
FIG. 6 is a front view showing the mounting of the meter socket adapter to the utility meter socket.
Figure 7:
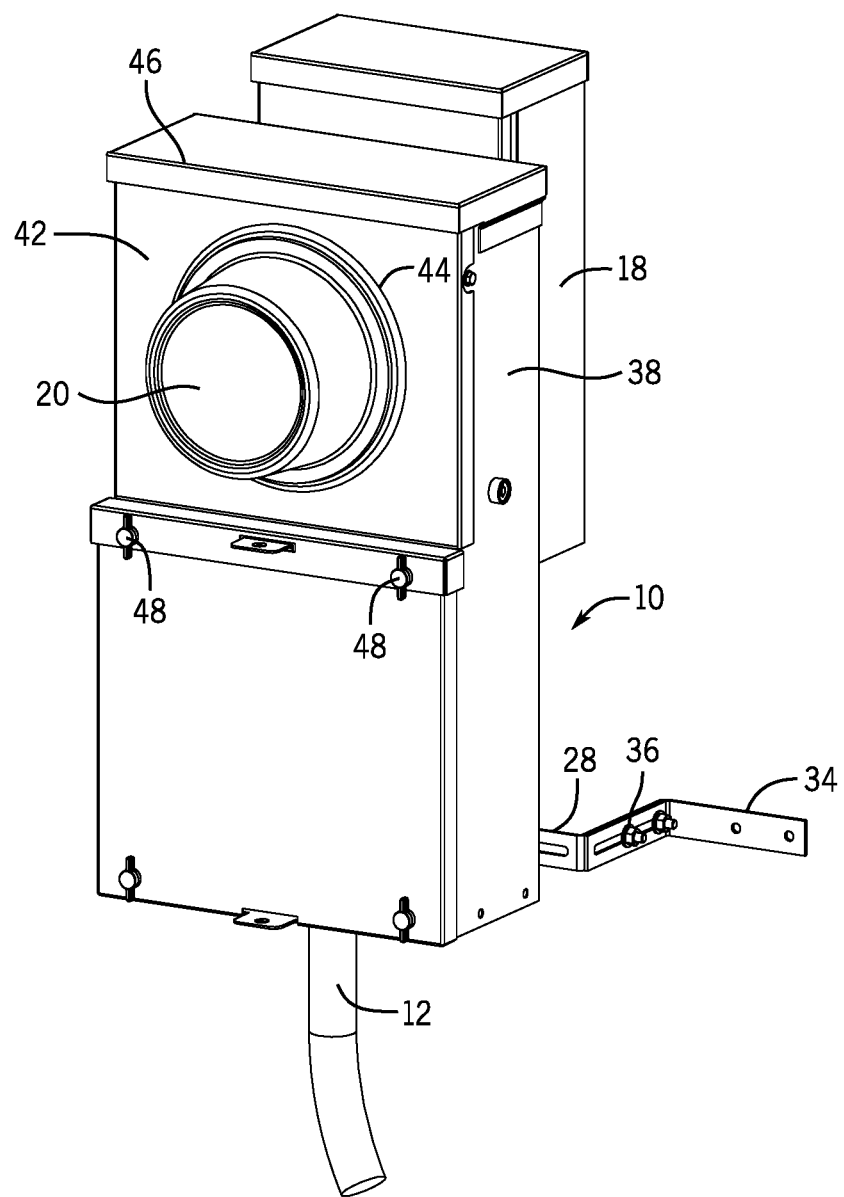
FIG. 7 is a perspective view of the meter socket adapter.

FIGS. 5-7 illustrate the meter socket adapter 10 securely mounted to the utility meter housing 18. Typically, the utility meter housing 18 will be mounted to a wall of a building or home. The utility meter housing 18 can be mounted to either an exterior wall of a building or, in some instances, can be mounted inside a building. As discussed previously, the utility meter housing 18 typically receives the electricity meter 20. However, when the meter socket adapter 10 is utilized, the electricity meter 20 is received within the meter socket adapter 10 while the meter socket adapter 10 is received within the meter socket of the meter housing 18. In the embodiment shown in FIGS. 5-7, a support bracket 28 is attached to a back surface 30 of the outer housing 14. Although not required, the support bracket 28 is typically attached to the same wall that supports the meter housing 18. The support bracket 28 provides support for the bottom end 32 of the meter socket adapter 10. As can be best understood in FIG. 7, the support bracket 28 includes a pair of extending horizontal mounting portions 34 that can be securely attached to a wall surface. A pair of adjustment bolts allow the depth of the support bracket 28 to be adjusted depending upon the thickness of the meter housing 18.

Referring back to FIG. 5, in the embodiment illustrated, the meter socket adapter 10 includes a first power compartment 38 and a second control board compartment 40. In one contemplated embodiment, these two compartments can be accessed separately. In the embodiment illustrated, the contacts and connections for the electricity meter and transfer switch are contained within the upper power compartment 38 while the control boards and electrical wiring for the transfer switch controls and contacts, as well as the load management controls, are included within the control board compartment 40.

Figure 8:
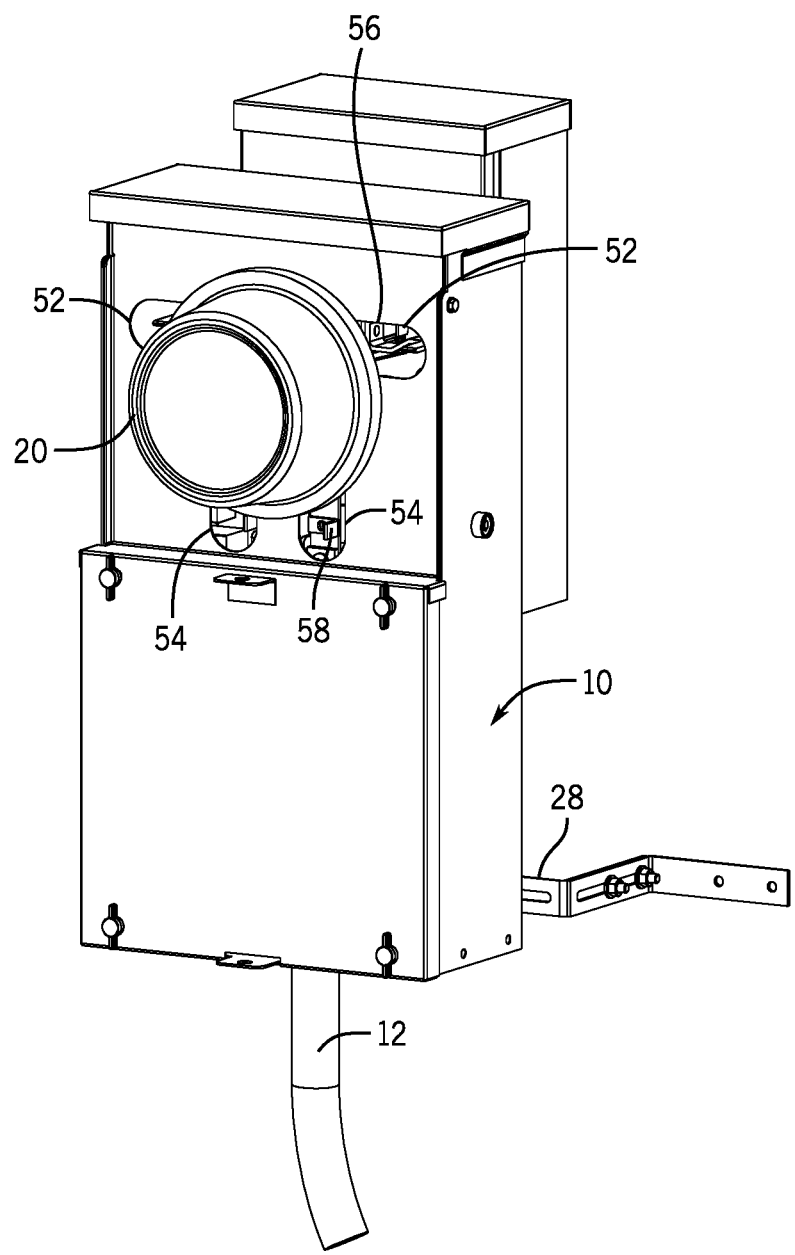
FIG. 8 is a front view illustrating the removal of the top access panel.
Figure 9:
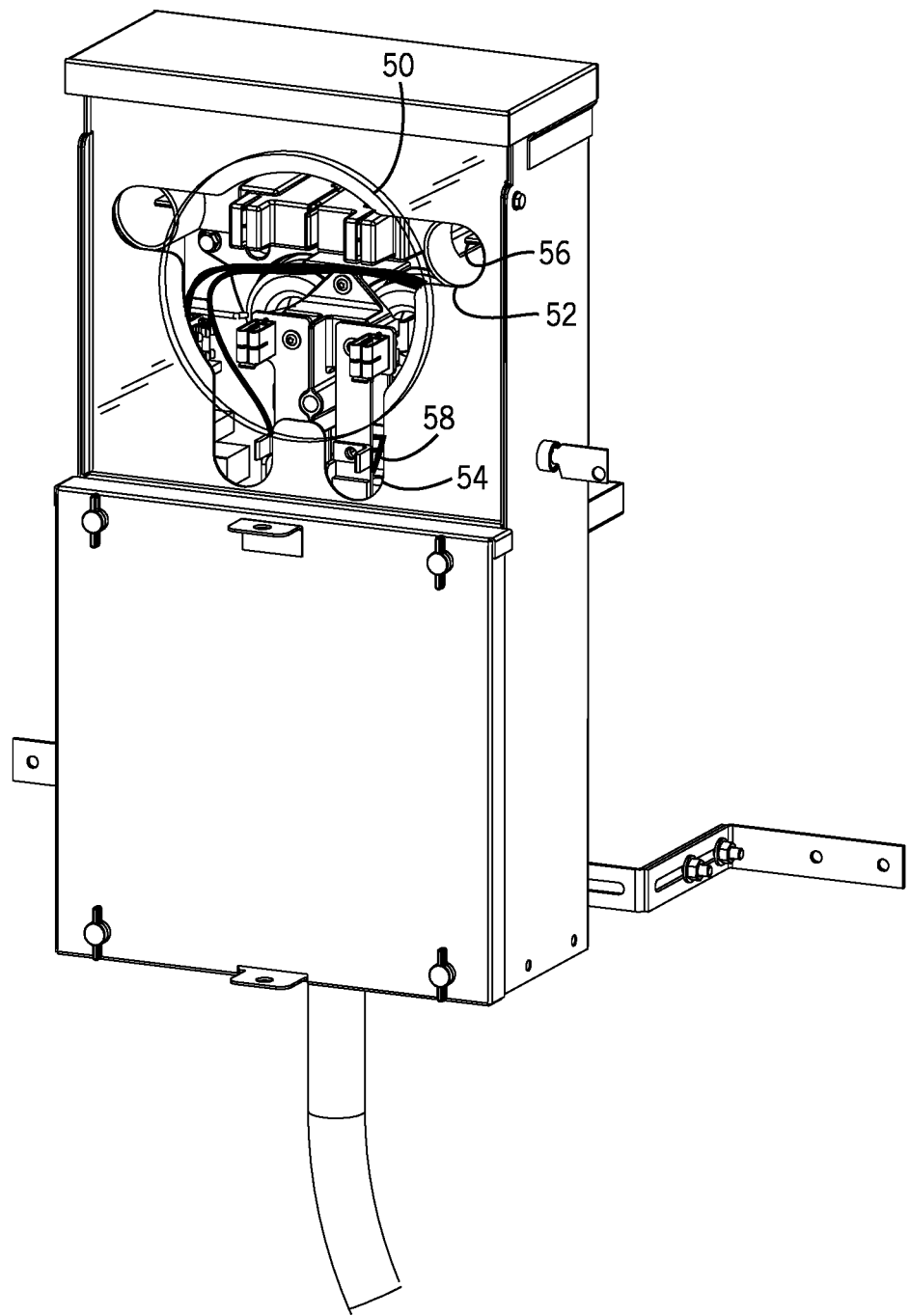
FIG. 9 is a front view illustrating the removal of the utility meter from the meter socket adapter.

As illustrated in FIG. 7, the upper power compartment 38 includes a protective cover 42 having a central opening 44 that allows the meter 20 to extend through the cover 42, yet retains the meter flange with its "ringless" cover design, as is known in the industry. Alternatively, a ring-type meter retention system (not shown) can be used with the appropriate protective cover and retaining ring. The cover 42 is received beneath the top cover 46 and is held in place by a pair of connectors 48, or more conventional pivoting latch (not shown). When the connectors 48 are removed, the entire cover 42 can be removed, as illustrated in FIGS. 8 and 9. In the embodiment illustrated, the meter socket adapter contact block is designed with a horn bypass feature. This feature includes a bypass tab 56 on the bus bar for both the load-side and line-side of the contact block. The horn bypass is a conventional feature that allows a jumper cable to bypass the meter such that the meter can be removed/exchanged without disrupting power to the home.

In the embodiment illustrate, when the cover 42 is removed, a clear plastic shield 50 is exposed. The plastic shield 50 covers a pair of upper bypass openings 52 and a pair of lower bypass openings 54. The plastic shield 50 thus allows the meter to be removed, as shown in FIG. 9, while still covering the bypass tabs 56 and 58. The live bypass tabs 56 of the line-side are contained within the upper bypass openings 52 while the load-side contacts 58 are contained within the lower bypass openings 54. The plastic shield 50 includes a central opening such that the shield 50 can be removed without removing the meter. The plastic shield 50 is designed to protect a service technician from inadvertent contact whenever the line bypass tabs are energized. Although the shield 50 is described as being formed from a clear plastic material, it is contemplated that other types of materials (such a metal) could be utilized while operating within the scope of the present disclosure.

Figure 10:
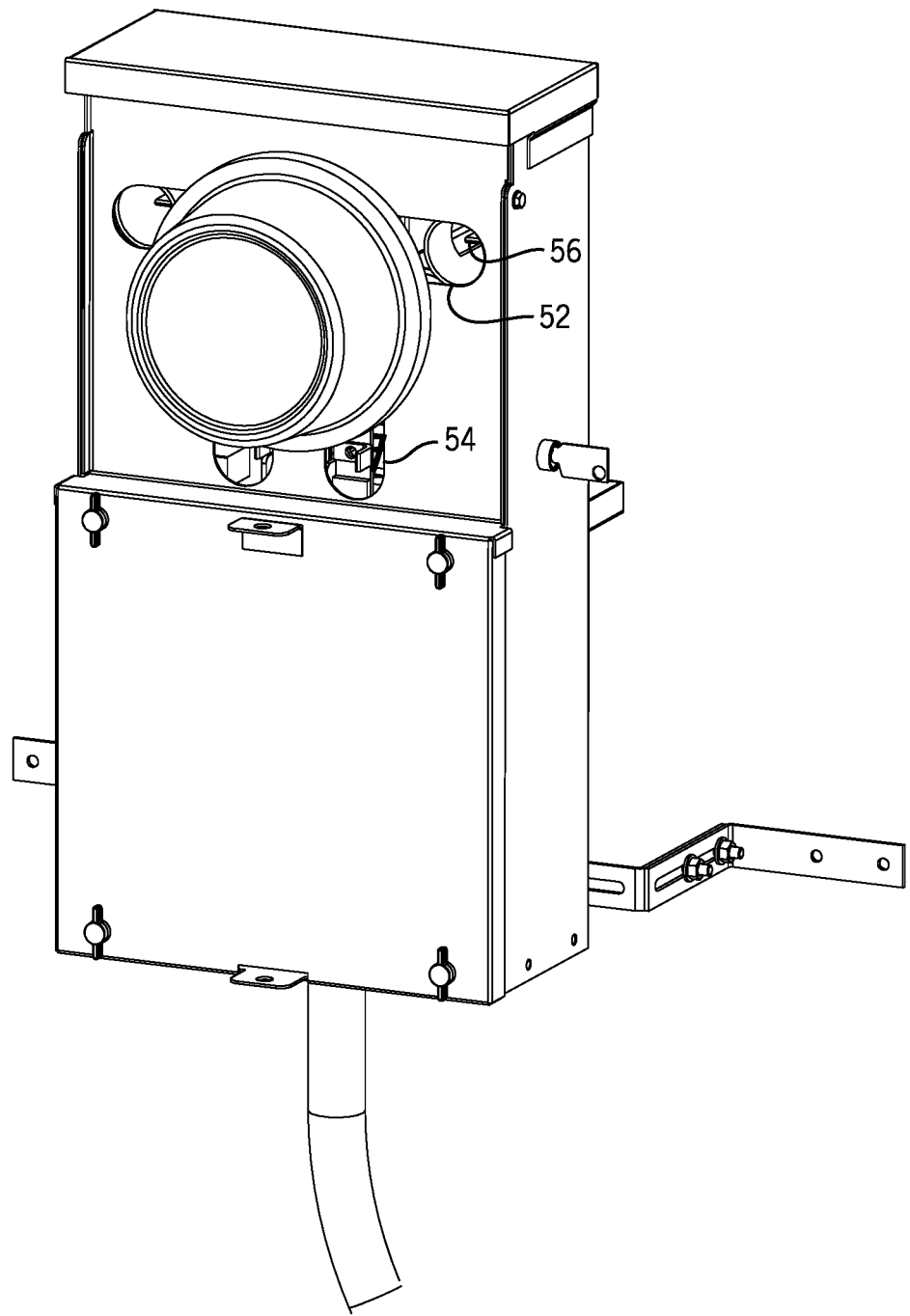
FIG. 10 is a front view with the meter in place and the horn shield removed.

When the plastic shield 50 is removed, as shown in FIGS. 8 and 10, the line-side and load-side bypass tabs 56 and 58 are exposed. The bypass tabs 56, 58 allow jumpers to be connected between the load-side bus bar and the line-side bus bar to bypass the meter 20. This is important for servicing the meter without having to interrupt power supply to the home or business served by the meter. As an example, if the meter 20 needs to be serviced, service personnel remove both the outer cover 42 and the plastic shield 50 to expose the bypass tabs 54 and 56. Once these bypass tabs are exposed, a jumper is installed to bypass the meter 20. Once the meter has been bypassed, the meter can be pulled from the meter socket adapter 10 for servicing. When the meter is removed without bypassing, the lower load-side portion of the meter socket adapter is completely de-energized, while the upper line-side contacts may still be energized.

Figure 12:
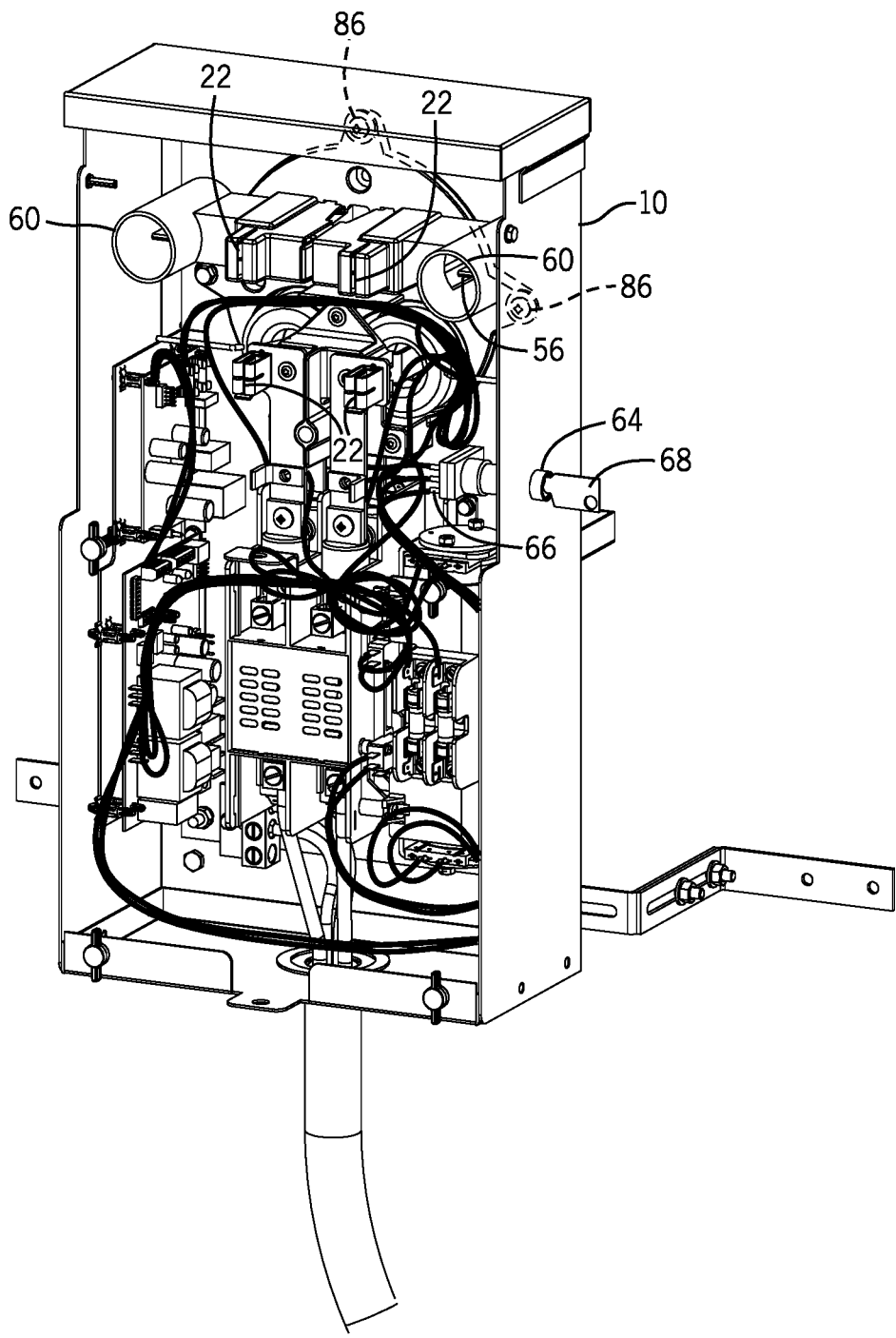
FIG. 12 is a front view of the meter socket adapter with the protective covers removed from the meter socket adapter.

FIG. 12 illustrates a pair of cylindrical guards 60 that surround each of the live bypass tabs 56 and the upper line-side contact jaws 22. The cylindrical guards 60 restrict inadvertent contact between the service personnel and the live bypass tabs 56. While guards 60 are shown to be cylindrical in FIG. 12, guards 60 may be any appropriate shape so as to restrict inadvertent contact with live bypass tabs 56. In the embodiment illustrated, each of the cylindrical guards 60 are formed from a clear plastic, although other non-conductive materials are contemplated as being within the scope of the present disclosure. As illustrated in FIG. 12, the meter socket adapter 10 includes the four contact jaws 22. As previously described, the contact jaws 22 receive mating blades formed on the back of the electricity meter. The spacing between the contact jaws 22 is defined and dictated by the spacing of the contact blades on the back of the electricity meter 20.

Figure 11:
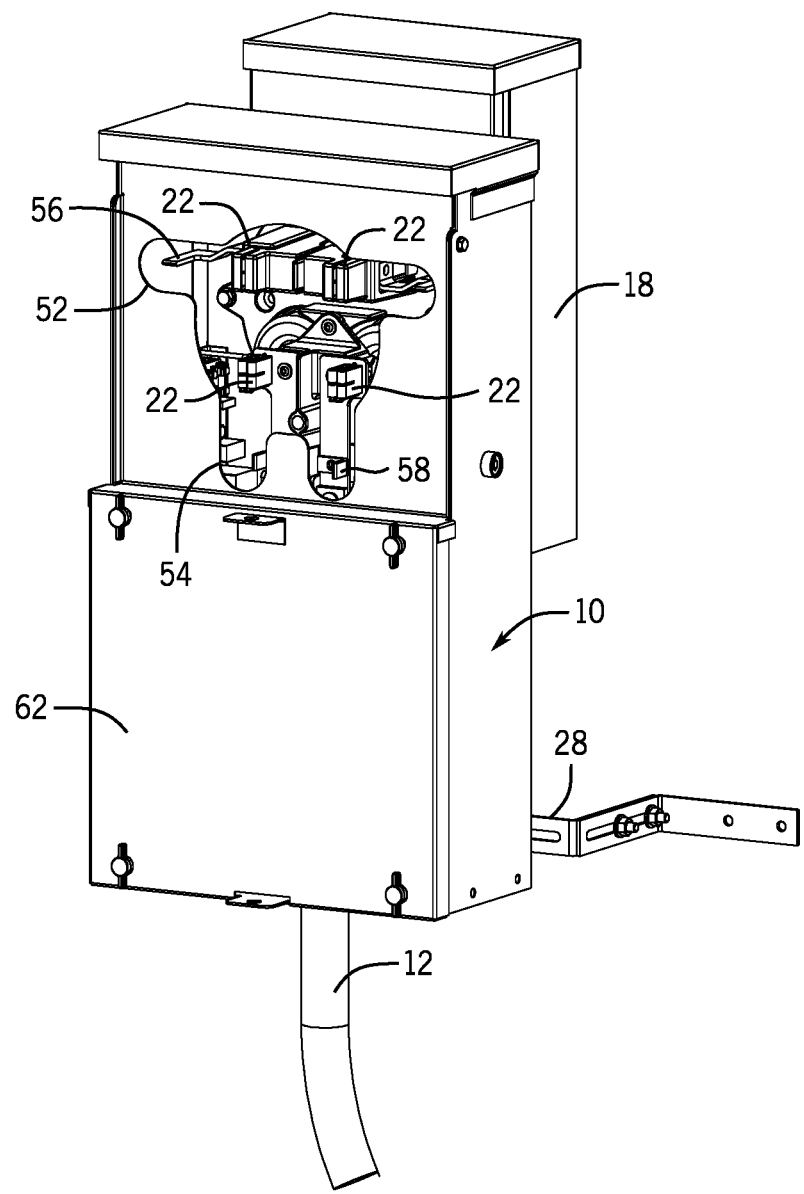
FIG. 11 is a front view similar to FIG. 8 with the electricity meter removed.

Referring now to FIG. 11, the meter socket adapter 10 is shown with the meter and the clear shield 50 removed. The bypass tabs 56 and 58 are shown as being accessible through the upper bypass openings 52 and the lower bypass openings 54. Likewise, the contact jaws 22 can be seen in this view.

Figure 11A:
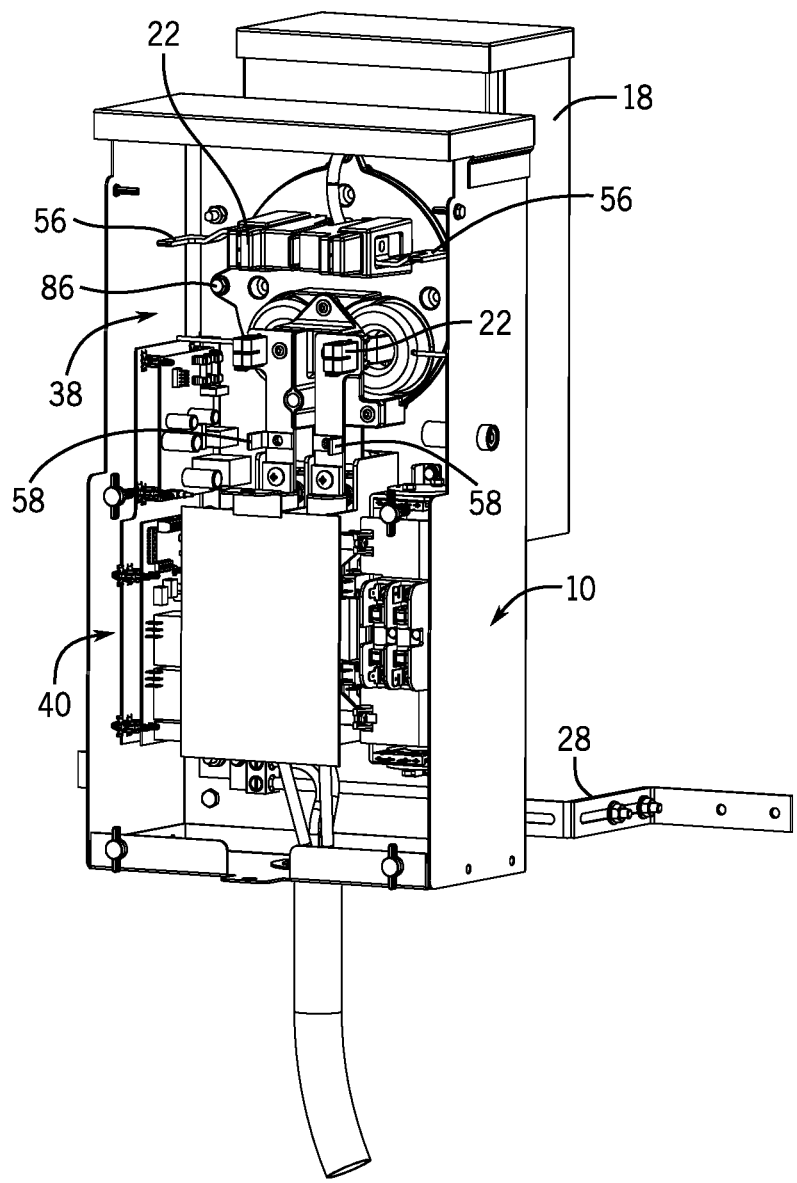
FIG. 11(a) is a front perspective view showing the internal components of the meter socket adapter and the internal, integrated transfer switch.

FIG. 11a illustrates the internal components contained within the meter socket adapter 10 once the front cover 62 is removed. As illustrated, the central opening in the front cover 62 is smaller than the flange portion of the electrical meter. Thus, the meter must be removed before the front cover 62 can be removed. Removing the meter acts as a disconnect to the lower portion of the meter socket adapter and de-energizes that portion. As can be understood in FIG. 2, the front cover 62 is a single component that, once removed, provides access to both the power compartment 40 and the control board compartment 38. In an alternate embodiment of the disclosure, the power compartment 38 and the control board compartment 40 are separately accessible.

Referring to FIG. 12, the meter socket adapter 10 includes a key switch 64 that is connected through a series of wires 66 to the controller of the transfer switch. The key switch 64 is a multi-position switch that allows an operator to select between different modes of power operation. These different modes could include "normal operation", "generator service", "system test", "on-site power source selector" and "generator disable" modes. The multi-position switch 64 is shown as extending through the outer housing of the meter socket adapter 10 and controlled by the position of a key 68. However, different types of switches and activation devices are contemplated as being within the scope of the present disclosure. Further, it is contemplated that the key switch 64 could be eliminated in other embodiments.

In one embodiment of the disclosure, the key switch is movable between three different positions. The first position, referred to as the service mode, kills the AC power to the generator only. When the key switch is in this position, power is disabled to the generator, which allows service to be performed on the generator. In the second position, the key switch is in the normal mode, which allows the transfer switch controller and load management controller to operate in their normal mode. The third position for the key switch is the system test position. When the key switch is moved to this position, the transfer switch controller simulates a loss of utility power. Upon this simulated loss of power, the transfer switch controller signals the activation of the standby generator and transfers generator power to the building. In this manner, the key switch is able to test the operation of the standby generator system quickly and easily. In prior systems that do not include a key switch, an operator is required to either pull a fuse from the transfer switch or de-activate a breaker to simulate the loss of utility power. Additional positions for the key may be added if required.

Figure 13:
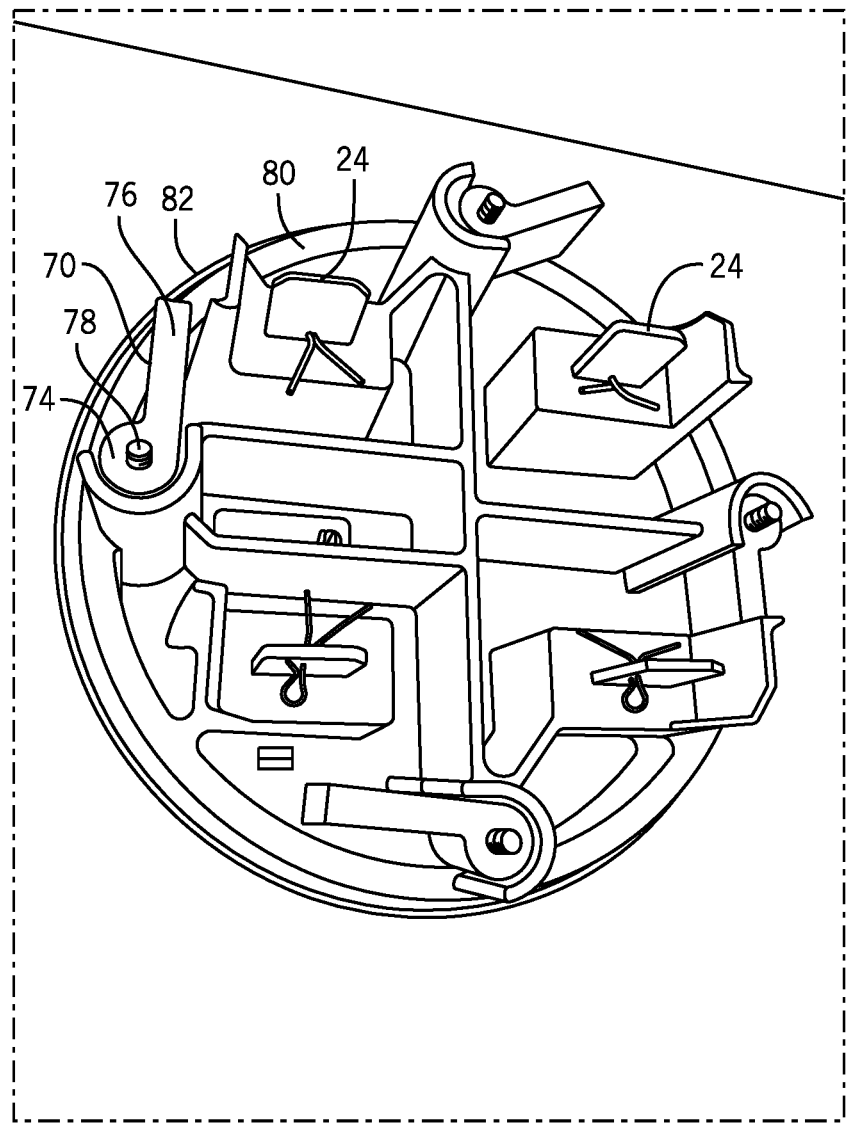
FIG. 13 is a back view illustrating the locking lugs used to secure the meter socket adapter to the housing for the utility meter socket.

Referring back to FIG. 3(b), the meter socket adapter 10 of the present disclosure includes a series of locking lugs 70 that are operable to engage an inner surface 72 of the meter housing 18. FIG. 13 illustrates the locking lugs 70 in additional detail. Each of the locking lugs 70 includes a mounting portion 74 and a locking leg 76. The mounting portion 74 includes a bolt 78. In FIG. 13, each of the locking lugs 70 is in its retracted position such that the mounting lug 80 can be inserted into the circular opening defined by the meter housing and which provides access to the meter socket. The opening in the meter housing is sized similar to the opening 82 formed on the back of the meter socket adapter 1.

Figure 14:
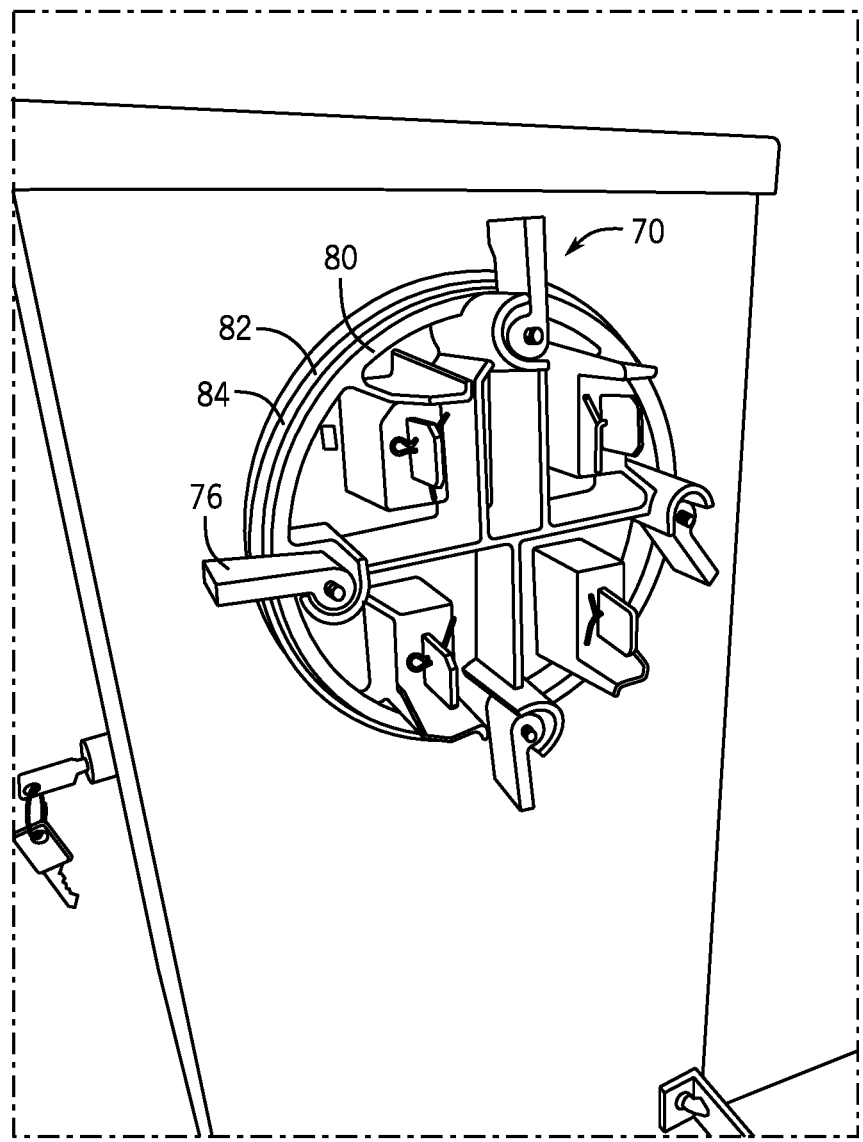
FIG. 14 is a back view similar to FIG. 13 with the locking lugs each in the engaged position.

As illustrated in FIG. 14, once the mounting lug 80 is inserted, each of the locking lugs 70 is moved to the locking position shown in FIG. 14. In this position, each of the locking legs 76 extends radially outward past the inner edge 84 that defines the opening 82. When in this position, the four locking lugs 70 engage the inner wall of the meter housing to support the weight of the meter socket adapter 10 on the meter housing.

Referring back to FIG. 12, each of the bolts 78 includes a head 86. When the head 86 is rotated, the rotation causes the locking lugs to move between their retracted and extended positions. Thus, once the meter socket adapter 10 is positioned such that the mounting lug is received within the meter socket, each of the bolt heads 86 is rotated to cause the locking lugs to move to their extended position to hold the meter socket adapter 10 on the meter housing.

Although locking lugs are shown in the embodiment illustrated, it is contemplated that other types of mounting arrangements could be utilized to secure the meter socket adapter 10 to the meter housing. In addition, different types of meter housings are contemplated that will require various other types of mounting arrangements to secure the meter socket adapter 10. In each case, the contact blade extending from the back surface of the meter socket adapter 10 must be received within the contact jaws formed in the meter socket.

Figure 15:
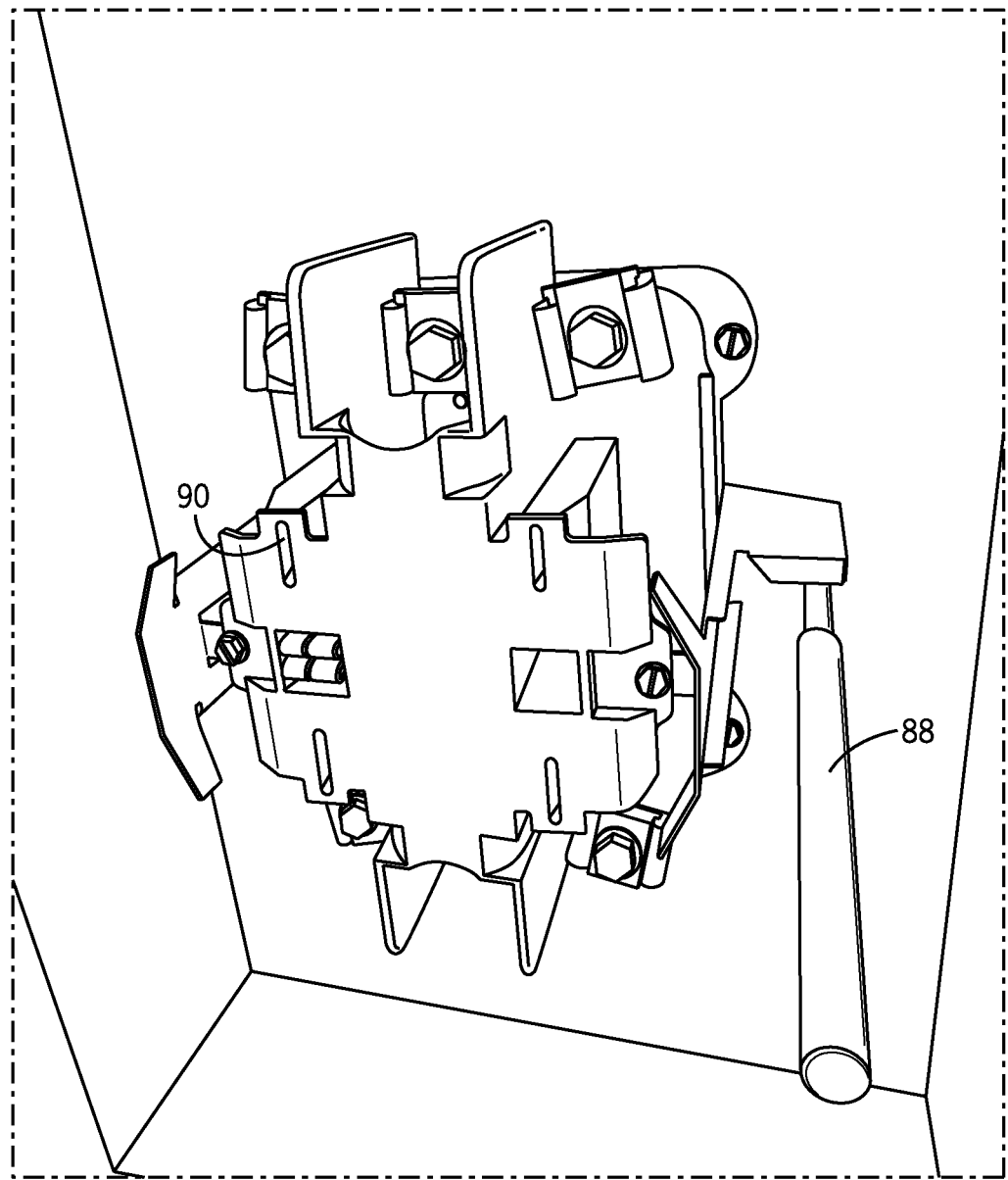
FIG. 15 is a front view of an alternate meter socket contact block utilizing a lever bypass.

Referring back to FIG. 13, the contact blades 24 can clearly be seen in the desired spaced relationship such that the contact blades 24 can be received within the contact jaws formed in the meter socket. In the embodiments previously described, the meter socket included a series of contact jaws that received the standard contact blades, such as shown in FIG. 13. However, different meter manufacturers have different types of meter sockets that are designed to receive and retain their meters. One example of an alternate meter socket is shown in FIG. 15. In this embodiment, a bypass lever 88 is used to lock the meter in place once the meter is received within the contact jaws 90. The bypass lever 88 moves elements of the contact jaws 90 toward each other to lock the meter in place. When the meter is to be removed, the bypass lever 88 is moved to its extended position shown in FIG. 15. When the bypass lever 88 is moved to the extended position, bypass blades of the contact block are moved into line and load positions, which allows current to flow through the meter socket with the meter either in or out of the socket.

Since the bypass lever 88 extends out well past the meter housing, the meter socket adapter 10 described previously cannot be used with the meter socket illustrated in FIG. 15. As a result, a contact adapter 92 has been developed, and is illustrated in FIGS. 16-19. The contact adapter 92 includes a series of contact jaws 94 extending from a front surface 96. The front surface 96 also includes a neutral jaw 95. The neutral jaw 95 provides a neutral connection from the generator to the home or building by allowing the neutral from the bus bar to be connected to the jaw 95. The back surface 98 includes a series of contact blades 100 and a neutral blade 101. The neutral blade 101 is provided to fit into the neutral contact jaw if available. If the neutral contact jaw is not available, the neutral can be shorted to the bus bar. By connecting the neutral wire from the bus bar to neutral blade 101 of contact adapter 92, the installation of meter socket adapter 10 is simplified. With this configuration, the installer does not need to "fish" a neutral wire out of the housing of the utility meter socket 18 and into the housing of meter socket adapter 10, all while simultaneously attempting to attach meter socket adapter 10 to utility meter socket 18. Instead, a short neutral wire can be run from the bus bar of utility meter socket 18 to neutral blade 101 of contact adapter 92 prior to coupling of meter socket adapter 10, thereby greatly simplifying the installation process.

Figure 16:
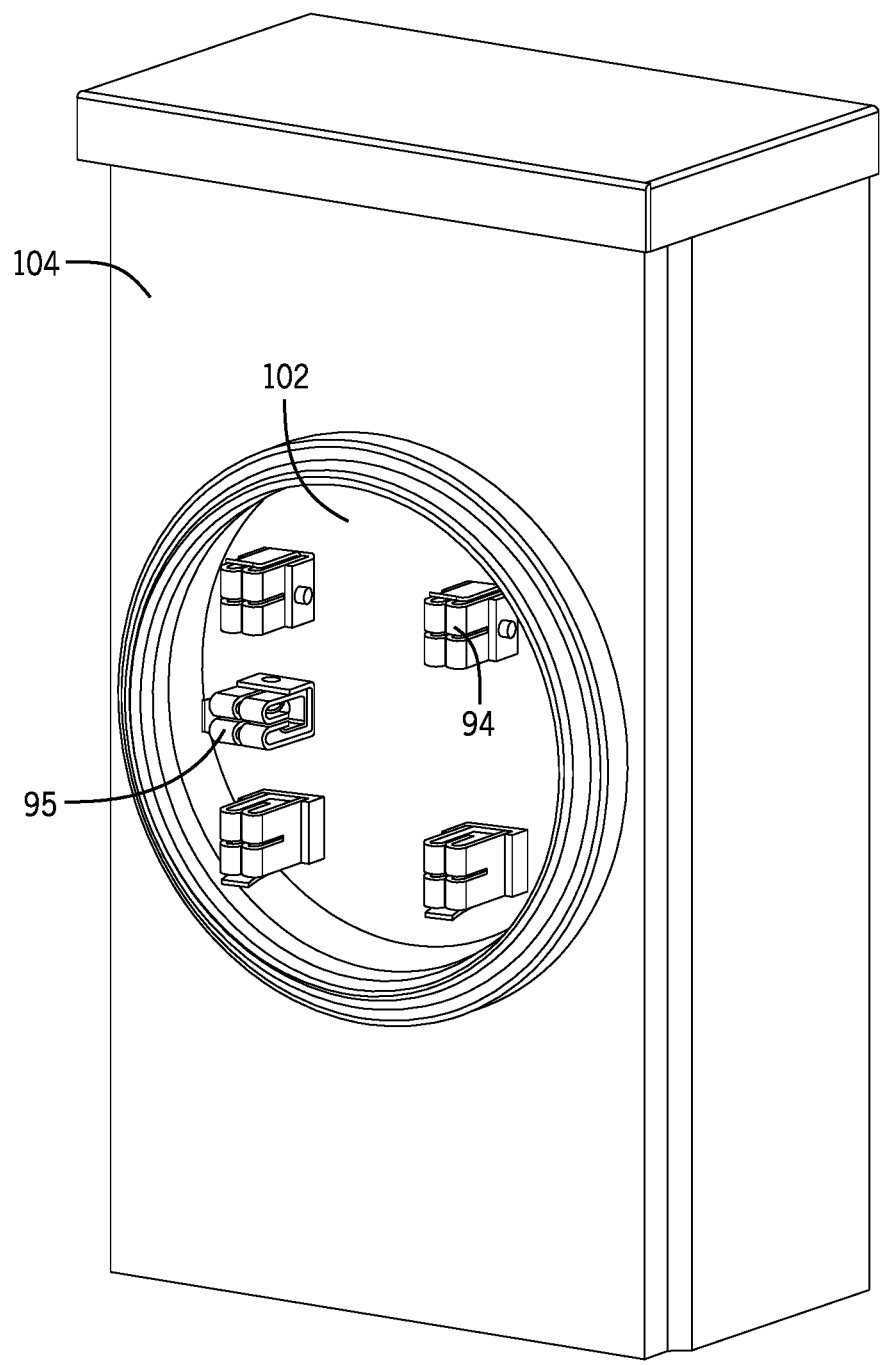
FIG. 16 is a front view of the utility meter socket utilizing a contact adapter of the present disclosure.
Figure 17:
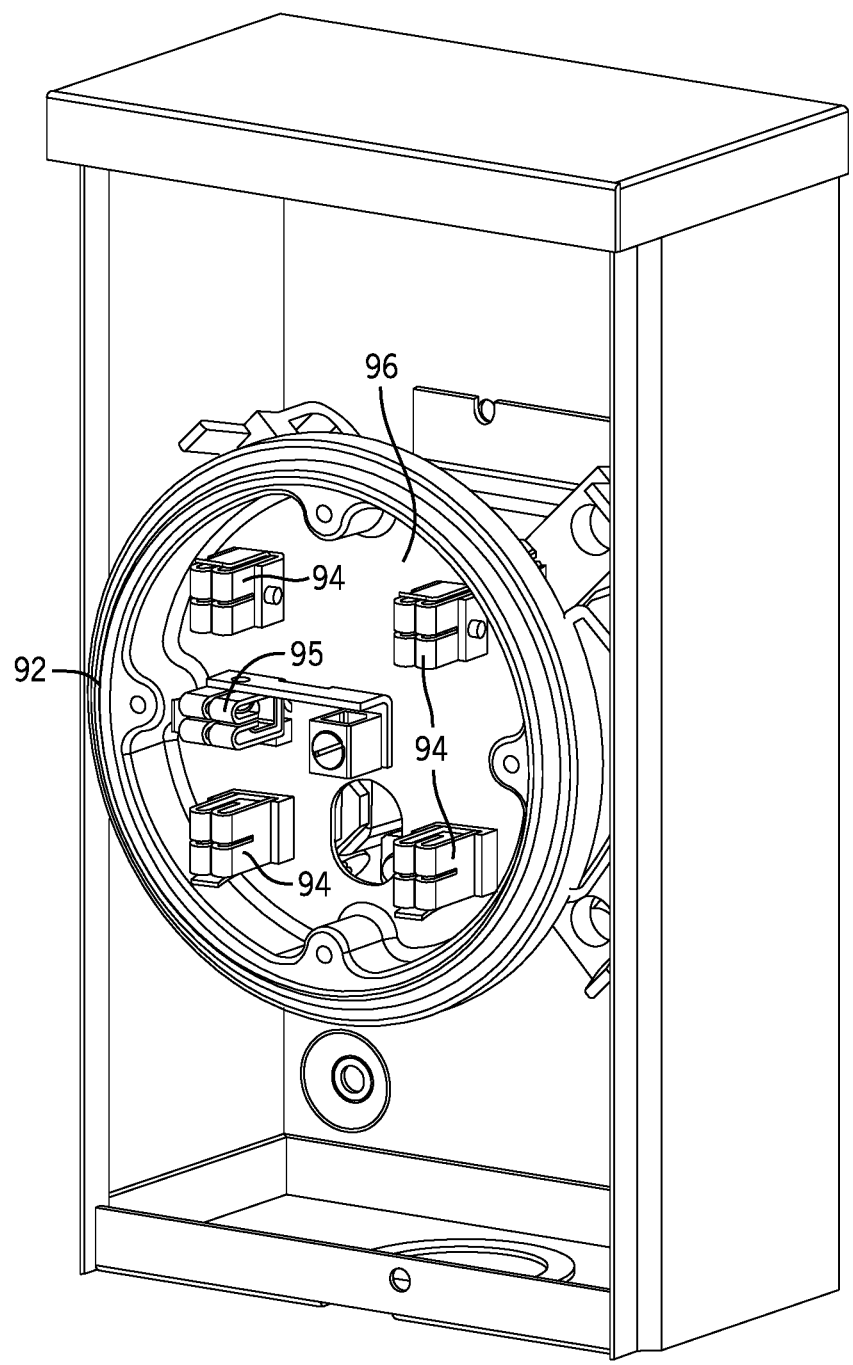
FIG. 17 is a view similar to FIG. 16 with the front access cover removed showing the placement of the contact adapter.

When the meter socket adapter 10 of the present disclosure is used with a meter contact block as shown in FIG. 15, the contact adapter 92 is utilized. Initially, the contact adapter 92 is installed into the position as shown in FIG. 17. When in this position, the bypass lever 88 shown in FIG. 15 can be moved to its locking position to securely lock the contact adapter 92 in the position shown in FIG. 17. Once in this position, the contact jaws 94 are accessible through the opening 102 formed in the outer surface 104, as illustrated in FIG. 16. The contact adapter 92 thus allows the meter socket adapter 10 described previously to be used with the contact arrangement shown in FIG. 15. In an alternative embodiment, the meter socket adapter may be provided with an additional bypass lever similar to bypass lever 88 to provide meter bypass and locking functionality.

Figure 20:
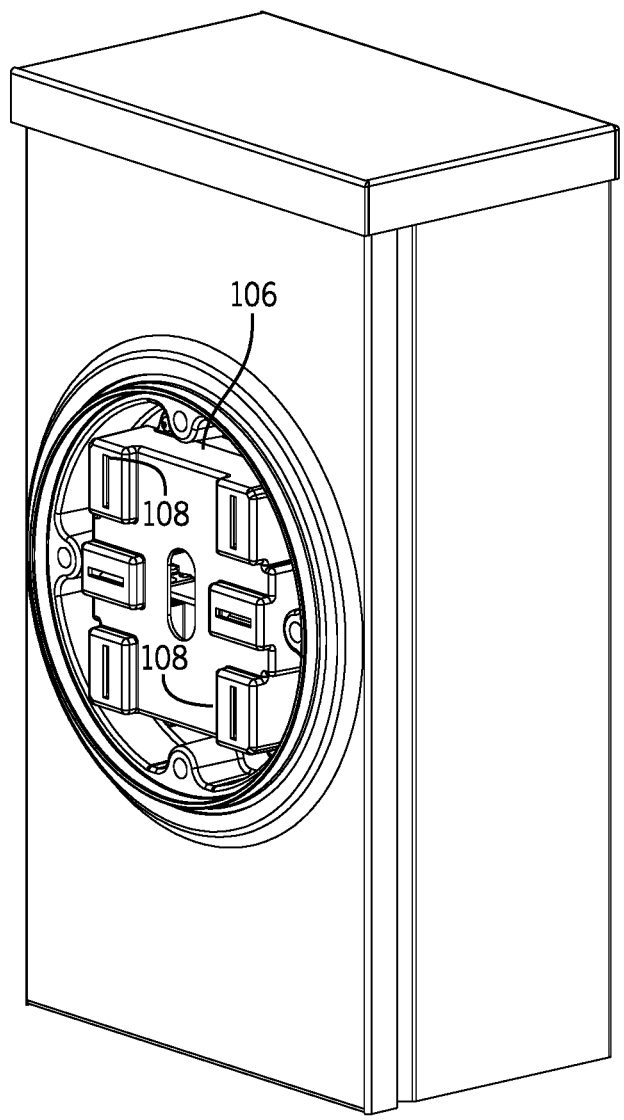
FIG. 20 is a front view of the utility meter socket utilizing the contact adapter and protection cover of the present disclosure.

FIGS. 2 and 20 illustrate a contact guard 106 that can be used with the contact adapter 92. The contact guard 106 is a protective cover that is positioned on the contact adapter and functions to cover the contact jaws 94 and the neutral jaw 95. The contact guard 106 is preferably formed from a non-conductive material, such as plastic and includes a series of guard blocks 108 aligned with each of the contact jaws 94. The contact guard 106 restricts inadvertent contact between the service personnel and the live contact jaws 94. The use of the contact guard 106 is optional.

The steps required to install the meter socket adapter 10 including the transfer switch will now be described. Initially, when the meter socket adapter 10 is to be installed at a home or business, the first step in the installation process is to remove the electricity meter from the existing utility meter socket, illustrated by reference numeral 18 in FIG. 2. This is accomplished by the utility removing power at the upstream transformer. After power is removed, the utility meter can be removed and the installation commenced. With the utility meter removed, in an embodiment that utilizes the contact adapter 92, the adapter 92 can then be installed. In such an embodiment, only the front cover 42 needs to be removed from the meter socket adapter 10. After the contact adapter 92 is installed, the existing meter cover is re-mounted and the contact adapter 92 extends through the cover as shown in FIG. 16.

In an embodiment that does not utilize the contact adapter 92, once the utility meter 20 has been removed, the front cover 62 of the meter socket adapter 10 is removed such that the internal components of the meter socket adapter 10 are accessible, as shown in FIG. 11. In such an installation, the neutral wire must pass through the hole in the front cover and be connected to the neutral terminal block in the lower left corner of the meter socket adapter 10. In an embodiment that utilizes the contact adapter 92, the neutral contact is created by the neutral jaws 95 and either a blade that extends through making contact with a set of neutral jaws existing in the meter box or a short wire connecting the neutral jaw of the contact adapter to the neutral bus of the meter box.

Once in this condition, the meter cover is installed and the meter socket adapter 10 is inserted into the meter socket such that the contact blades 24 extending from the mounting lug are received within the corresponding contact jaws formed in the meter socket. Once in this condition, the bolt heads 86 are rotated, causing the locking lugs 70 to rotate into the locked position shown in FIG. 14. Once the locking lugs are in this position, the meter socket adapter 10 is supported as illustrated in FIG. 11*a*. The support bracket 28 can be adjusted to further aid in supporting the weight of the meter socket adapter 10.

Once mounted, the front cover 62 is mounted to the outer enclosure, as shown in FIG. 11.

After the front cover is positioned, the plastic shield 50 shown in FIG. 9 is installed. In the preferred embodiment that utilizes the contact adapter 92, the front cover 62 and the plastic shield 50 do not need to be removed during installation. The meter is inserted into the contact jaws as illustrated in FIG. 8. Once the meter is installed, the cover 42 is attached, as shown in FIG. 7.

As can be understood by the above disclosure, if the meter socket adapter 10 including the enclosed transfer switch and load controller is no longer desired, the meter socket adapter 10 can be easily removed by simply removing the meter 20 and disconnecting the meter socket adapter. Once the meter socket adapter has been removed and the contact adapter 92 is removed, the electricity meter 20 is again installed in its original meter socket formed within the housing 18.

As can be understood in the foregoing disclosure, the main utility service disconnect is not affected when using the meter socket adapter 10 of the present disclosure, since the meter socket adapter 10 is an extension of the meter socket. The main disconnect remains in the distribution panel. Further, there is no need to move the neutral-to-ground bonding point that is typically located in the distribution panel, which greatly reduces the amount of time needed to install the transfer switch.

FIGS. 21-28 illustrate a second, alternate embodiment of the meter socket adapter 120 constructed in accordance with the present disclosure. Many components of the second embodiment of the meter socket adapter 120 are common with the first embodiment shown in FIGS. 2-20. For the common components, common reference numerals will be utilized.

In addition, it should be understood that the internal switching components to switch between the utility power source and the auxiliary power source, such as a standby generator, remain consistent between the first embodiment and the second embodiment. Likewise, the load management controller contained within the second embodiment of the meter socket adapter 120 functions in the same manner previously described in the present disclosure.

Figure 21:
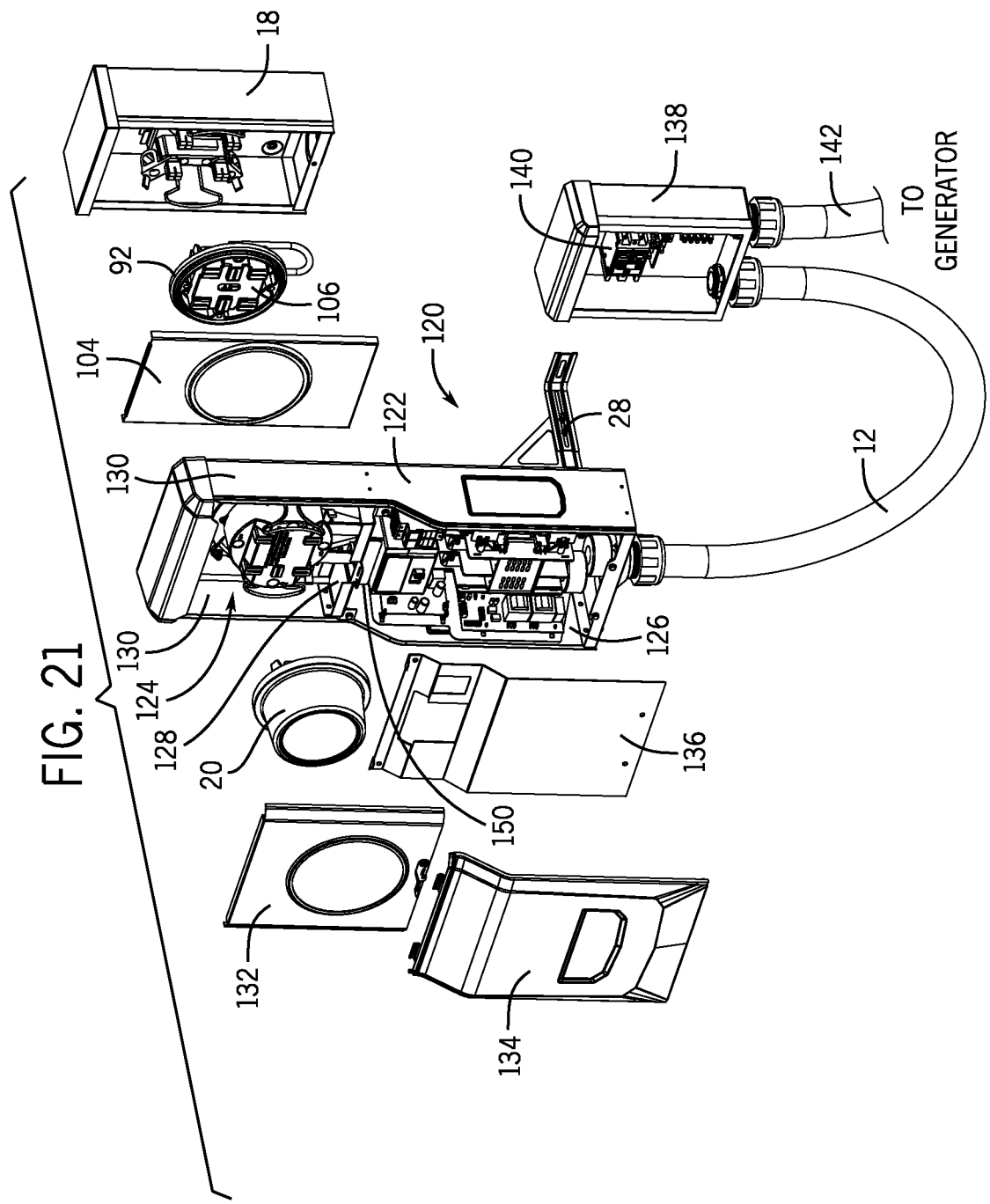
FIG. 21 is an exploded view of a second embodiment of the meter socket adapter.

The second embodiment shown in FIG. 21 includes a reconfigured outer housing 122 that defines a separate upper meter compartment 124 and a lower control compartment 126. The meter compartment 124 and the control compartment 126 are separated within the housing 122 by a divider wall 128 that is securely attached between the pair of spaced sidewalls 130. The divider wall 128 completely separates the meter compartment 124 from the control compartment 126 to isolate the connections needed for the electricity meter 20 from those needed to transfer power from the utility power source to the alternate power source. As illustrated in FIG. 21, the housing 122 mounts to the meter housing 18 utilizing the contact adapter 92 which includes the contact guard 106 installed thereon. As discussed previously, the utility meter housing 18 includes a removable outer cover 104.

As illustrated in FIG. 21, the meter compartment 124 receives an upper cover 132 while the control compartment 126 receives a lower cover 134. The upper cover 132 and the lower cover 134 are separate components that can be independently removed and/or attached to the outer housing 122. The lower cover 134 conceals a lower guard 136 that is separately attached to the outer housing 122 to conceal the transfer switch component and load management components contained within the control compartment 126.

Figure 22:
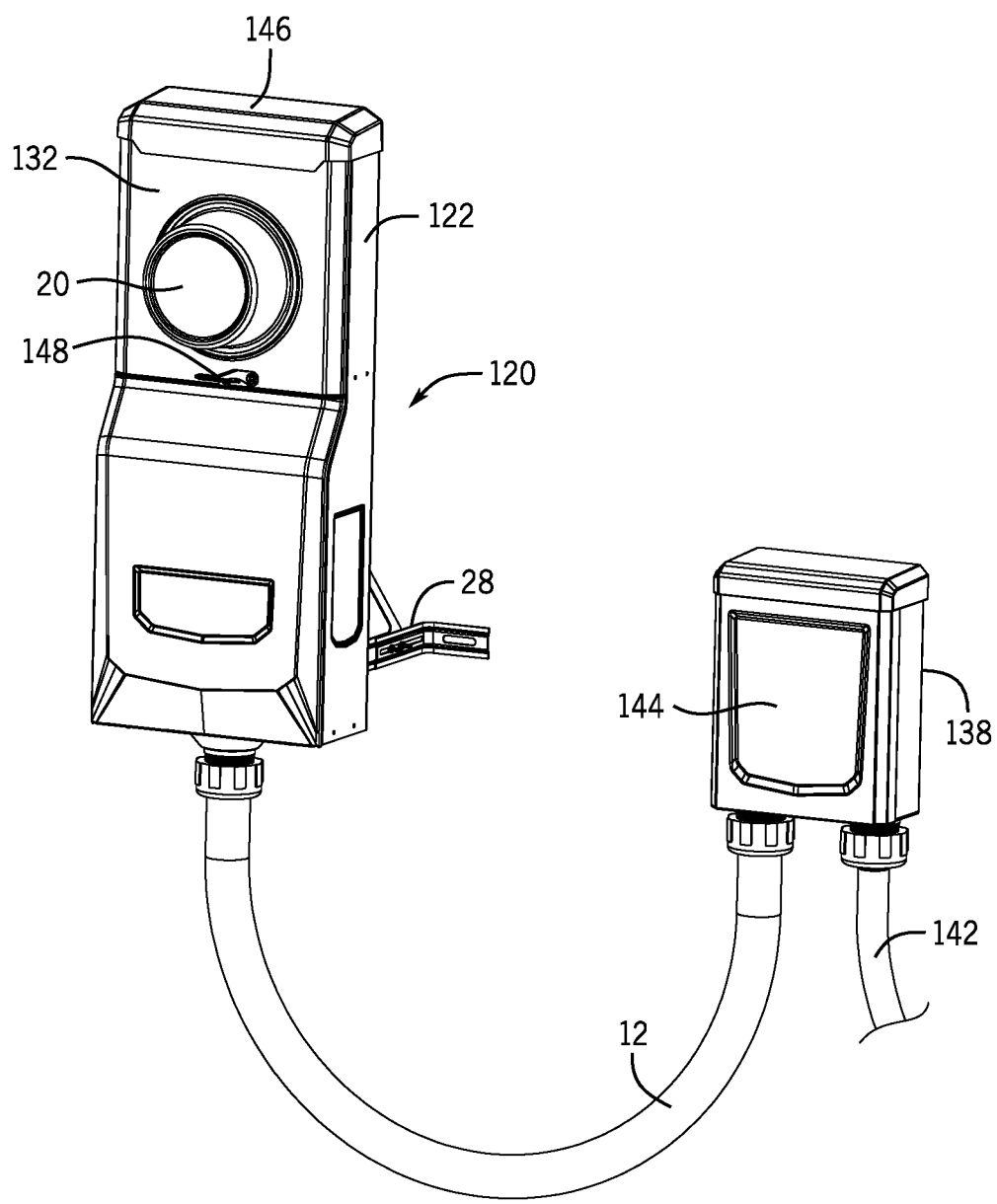
FIG. 22 is a front perspective view showing the meter socket adapter connected to a junction box.

In the embodiment shown in FIG. 21, the electronic operating components contained within the control compartment 126 are connected to the secondary power source, such as a generator, through a cable 12 that is received in a junction box 138. The cable 12 extends from the meter socket adapter 120 to the junction box 138 and has a length of six feet. However, the length of the cable 12 could be twenty-five feet or more depending upon the desired location of the junction box 138 relative to the meter socket adapter 120. The junction box 138 includes a connector block 140 that can provide the required electrical connections between a cable 142 coming from the generator or other type of auxiliary power source. The electrical connections made within the junction box 138 allow for a remote service disconnect that is located externally from the electrical components and connections made within the meter socket adapter 120. The connector block 140 shown in FIG. 21 can include fuses and a switch to interrupt the electrical connections between the generator and the meter socket adapter 120. As illustrated in FIG. 22, the junction box 138 includes an outer cover 144 that conceals the electrical connections made by the connector block 140. The outer cover 144 can be removed to access the electrical connections within the junction box 138 in a conventional manner.

Figure 23:
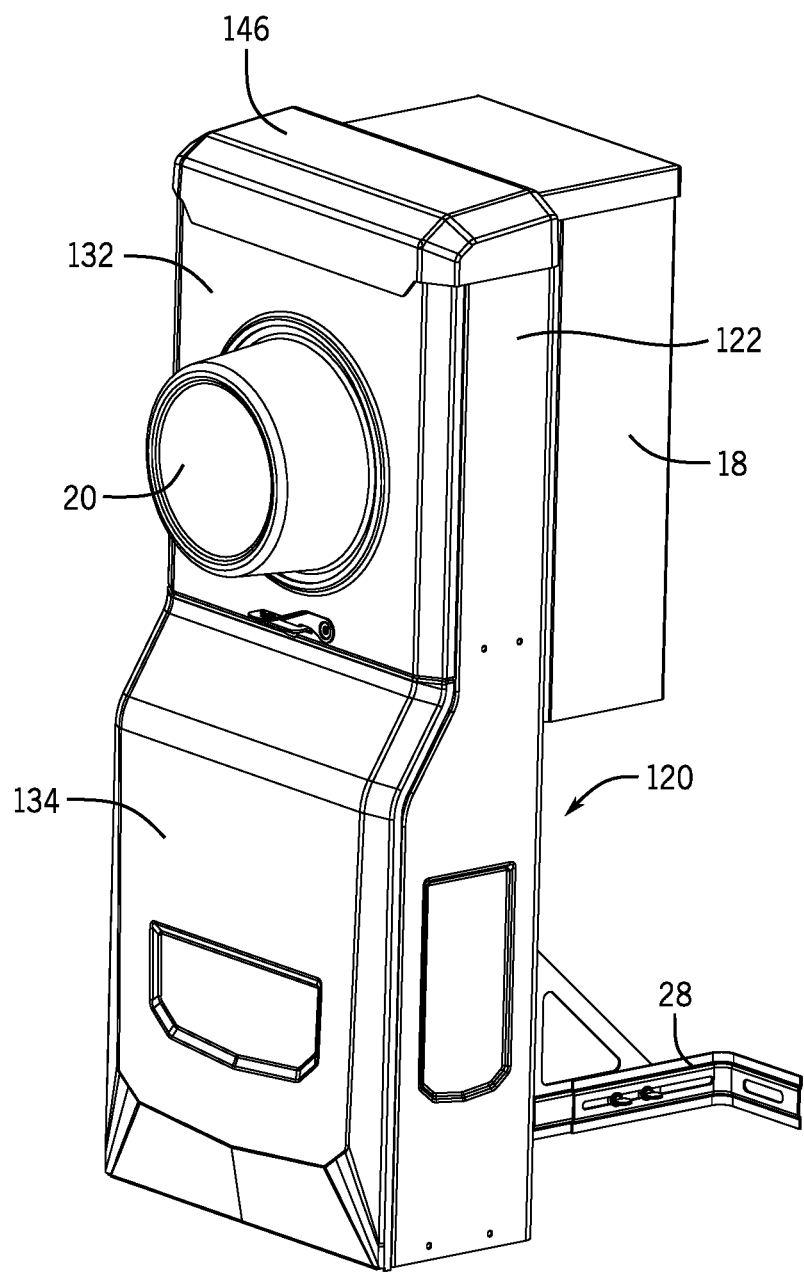
FIG. 23 is a front perspective view showing the meter socket adapter mounted to a utility meter socket.

Referring now to FIGS. 22 and 23, these figures illustrate the meter socket adapter 120 as installed on the meter socket housing 18. The installation of the meter socket adapter 120 onto the meter socket housing 18 is similar to the installation process described with respect to the first embodiment of the meter socket adapter 10 shown in drawing FIGS. 2-20. As in the first embodiment, the meter socket adapter 120 includes external contact blades that extend from the back surface of the meter socket adapter 120 and are received within corresponding contact jaws formed in the contact adapter received within the contact jaws formed in the meter socket. Once the meter socket adapter 120 is installed as shown in FIG. 23, the support bracket 28 can be used to support the lower portion of the outer housing 122 along the outer wall that supports the meter socket 18.

As illustrated in FIGS. 22 and 23, when the electricity meter 20 is installed within the meter socket adapter 120, the upper cover 132 is securely attached to the outer housing 122. A top cap 146 covers the upper portion of the upper cover 132. The lower portion of the upper cover 132 includes a locking tab 148 that is positioned adjacent to a corresponding locking tab 150 that extends from the divider wall 128, as shown in FIG. 21. When the upper cover 132 is installed as shown in FIG. 22, a utility can use a security tag (not shown) to join the pair of locking tabs 148 and 150. The security tag allows the utility to prevent unauthorized access into the meter compartment 124. If the utility needs to service the electricity meter, the utility removes the security tag and can then remove the upper cover 132. If another party attempts to tamper with the electricity meter 20, the security tag must be removed, which will indicate to the utility that unauthorized access has been granted into the meter compartment 124.

Figure 24:
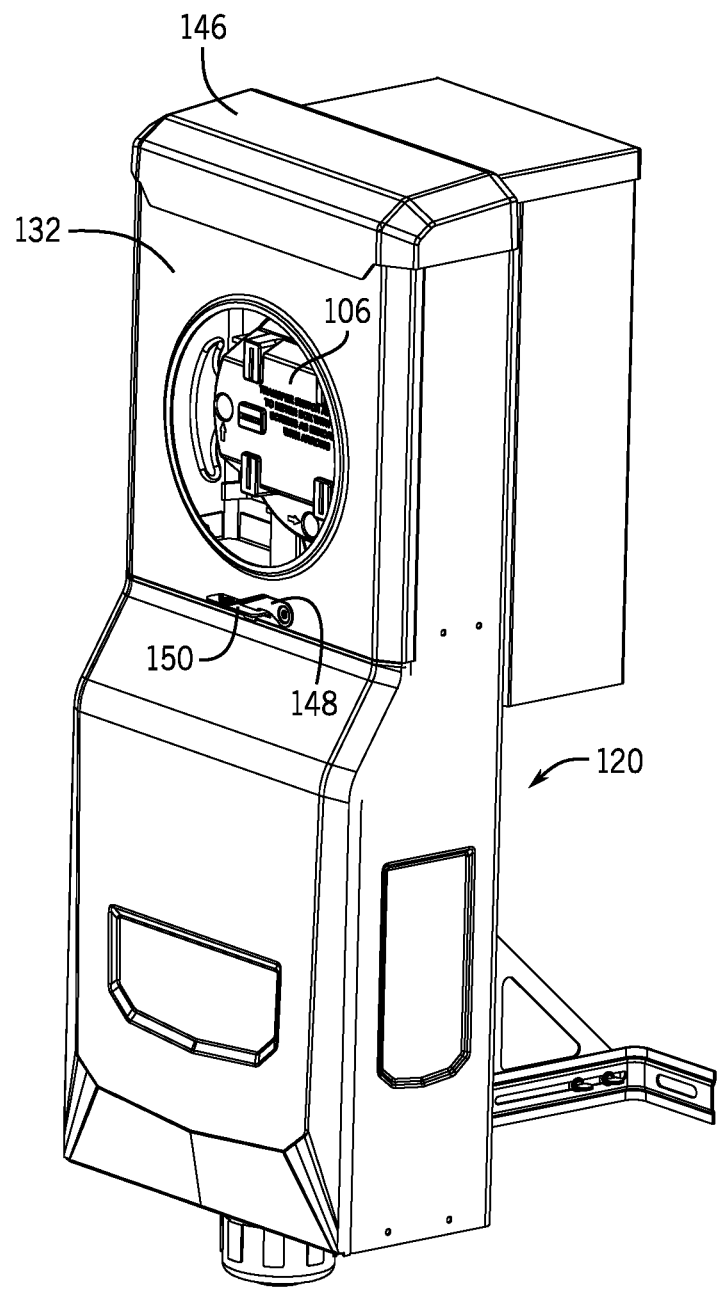
FIG. 24 is a front perspective view similar to FIG. 23 with the utility meter removed.
Figure 25:
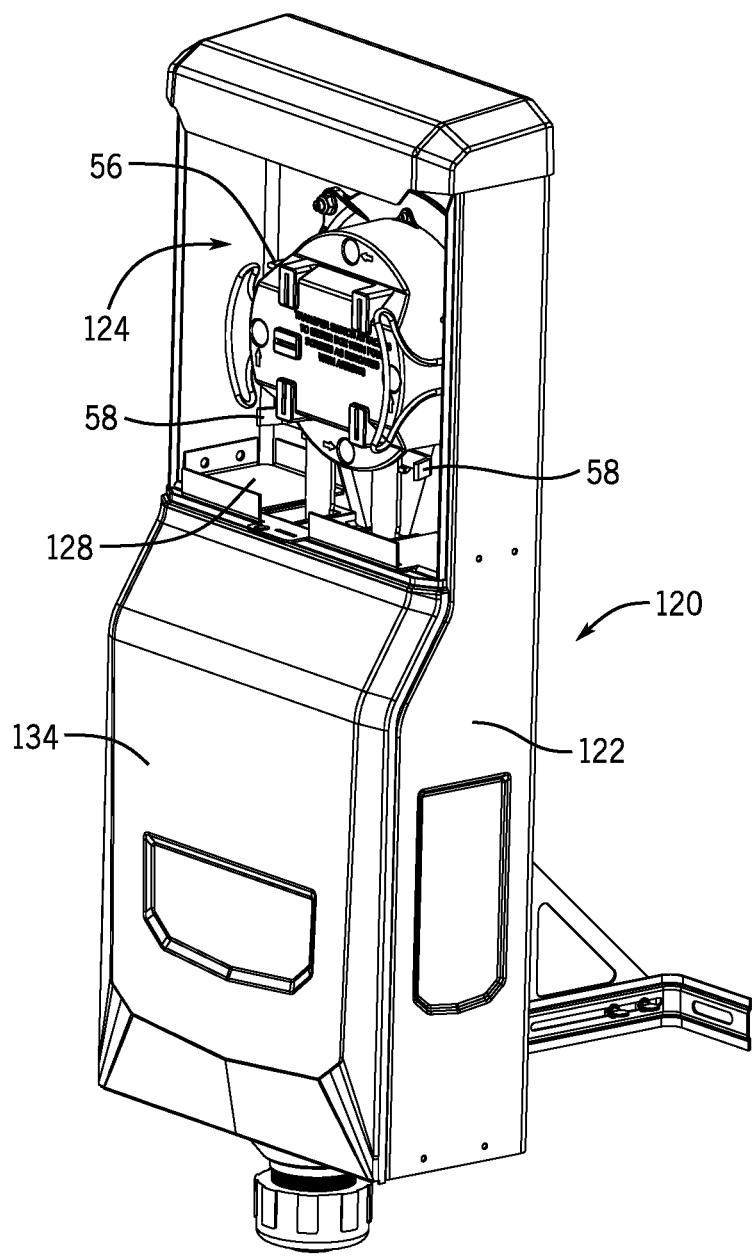
FIG. 25 is a front perspective view showing the removal of the utility meter and the upper cover.

If the utility needs to access the metering components contained within the meter compartment defined by the meter socket adapter 120, the utility first removes the meter 20 from the meter socket adapter 120, as is shown in FIG. 24. Once the meter has been removed, the contact guard 106 can be accessed by the utility. If the utility needs to access the components contained within the meter compartment, the utility can remove the security tag that extends between the pair of locking tabs 148, 150 and can then remove the upper cover 132. Once the upper cover has been removed, as illustrated in FIG. 25, the meter compartment 124 can be accessed. Once inside the meter compartment 124, the load side bypass tabs 56 and bypass tabs 58 can be used to bypass power past the meter socket to provide power to the home with the meter removed, as was described previously in the first embodiment. As can be understood in FIG. 25, when utility service personnel is accessing the meter compartment 124, the lower control compartment is completely sealed and electrically isolated by both the lower cover 134 and the divider wall 128. In this manner, the utility can simply remove the upper cover 132 and access all of the electrical connections and components that are required for servicing a meter. In this manner, the meter compartment 124 effectively functions the same as the meter housing and meter socket.

Figure 26:
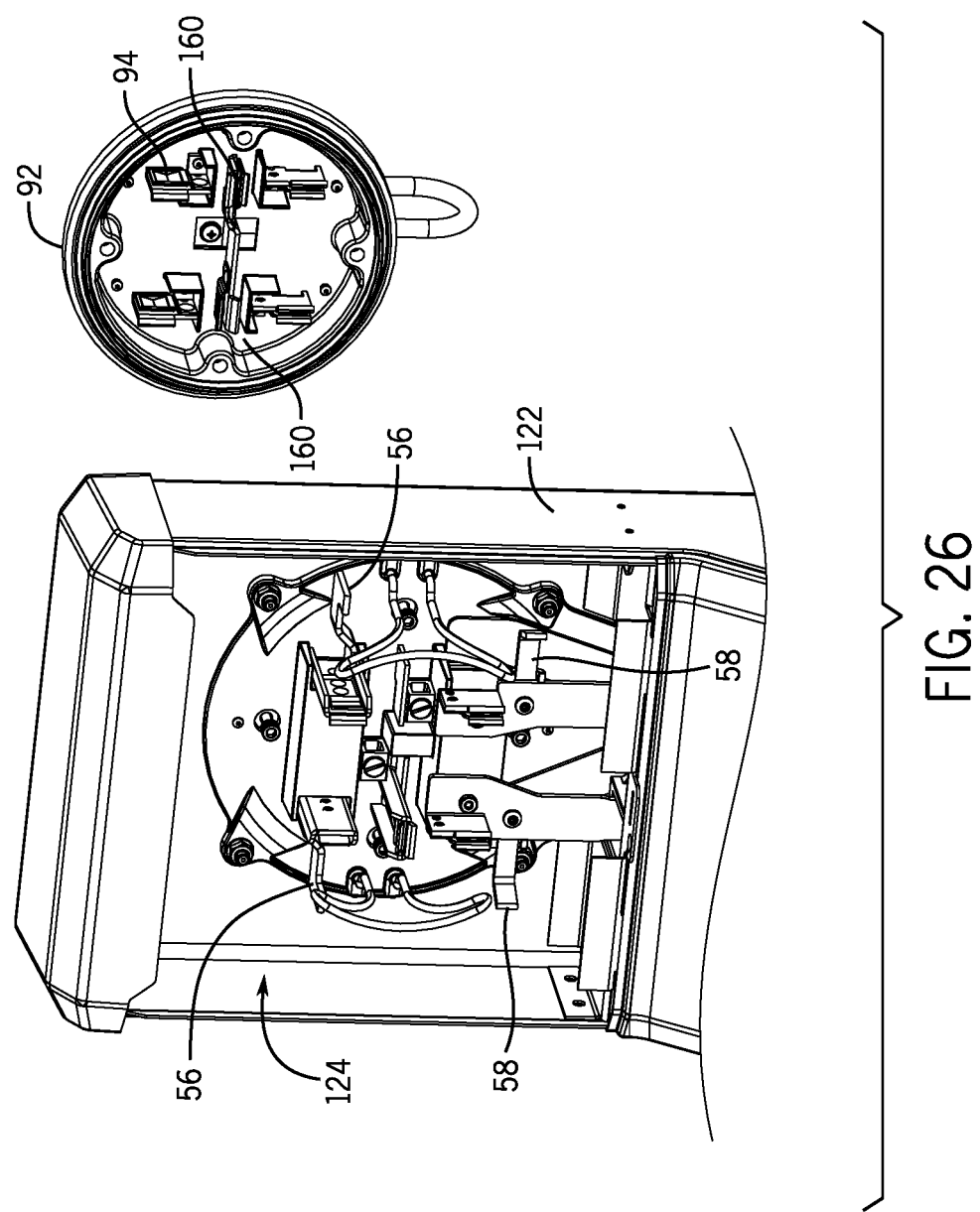
FIG. 26 is a magnified view showing the removal of the contact adapter from the meter housing.

FIG. 26 further illustrates the internal components contained within the meter compartment 124, which include the bypass tabs 56 and 58 as well as the contacts used to supply power from the utility to a home through the meter. The operating components contained within the meter compartment 124 are similar to those described previously with respect to the first embodiment.

As described previously, the meter socket adapter 120 of the present disclosure includes a control compartment 126 that is separate from the meter compartment 124. The complete separation between the meter components contained within the meter compartment 124 and the control components contained within the control compartment 126 allows for separate access and servicing of these two portions of the meter socket adapter 120. As discussed above, if utility service is required, the upper cover 132 can be removed to provide access to the meter components. Likewise, if service is required for the switching components and load shedding components, access can be provided to only these components without providing access to the meter socket.

Figure 27:
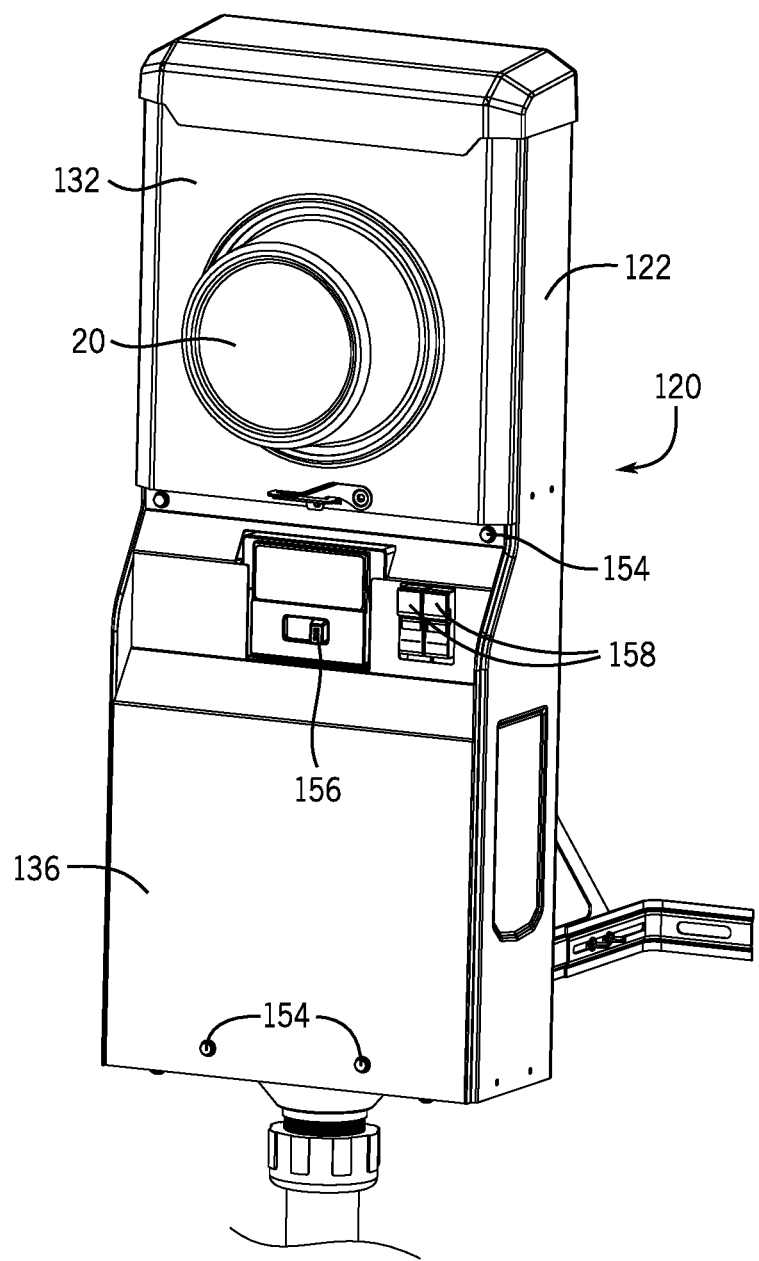
FIG. 27 is a front perspective view showing the removal of the lower cover of the meter socket adapter.

If a generator service is needed for the components associated with the standby generator, the service personnel can access the control compartment 126 without being given access to the meter compartment 124. As illustrated in FIG. 23, if access is required to the control compartment, the access is initially provided by removing the lower cover 134. The lower cover 134 is attached utilizing a series of screws 152 that attach the lower cover 134 to the outer housing 122. Once the screws 152 have been removed, the lower cover 134 can be removed, as illustrated in FIG. 27. Once the lower cover has been removed, the service person is able to view and access the lower guard 136. The lower guard 136 is separately attached to the outer housing 122 by an additional series of connectors 154.

Prior to removing the lower guard 136, the user has access to a power interrupt switch 156. The power interrupt switch 156 is a circuit breaker in the embodiment illustrated. The power interrupt switch 156, when moved to an open position, interrupts all power to the components contained within the control compartment positioned behind the lower guard 136. In this manner, service personnel can open the power interrupt switch 156 to completely kill power within the control compartment before servicing the transfer switch controller and components as well as the load management controller. It is contemplated that when service is required for the generator or the control components, the service personnel will first disconnect the generator prior to opening the power interrupt switch 156. If the generator is not disconnected first, opening the power interrupt switch 156 will be sensed by the generator as a loss of power, which will initiate the automated starting of the standby generator. The power interrupt switch 156 can be accessed only after the lower cover 136 has been removed, which requires a tool (screwdriver) to remove the screws 152.

Figure 28:
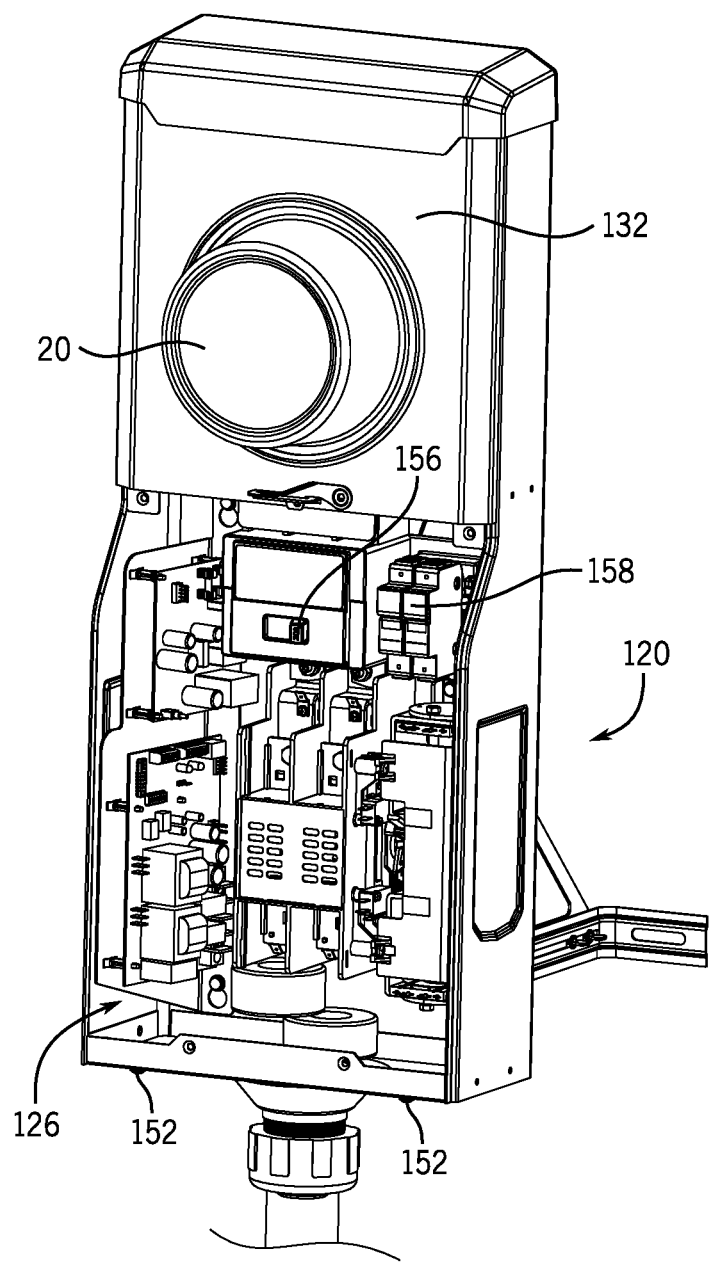
FIG. 28 is a front perspective view showing the removal of a lower guard providing access to the load management and transfer switch components.

Once the power interrupt switch 156 has been opened, the connectors 154 can be removed and the lower guard 136 removed to provide access to the control components within the control compartment 126, as best shown in FIG. 28. As can be understood in FIG. 28, when the service personnel has access to the control compartment 126, the electricity meter 20 remains installed and the generator service personnel cannot access any of the components contained behind the upper cover 132.

In addition to the power interrupt switch 156, trained service personnel can also access a pair of touch-safe fuse holders 158.

As can be understood in FIG. 28, when the lower guard is removed, the service personnel can access the transfer switch components and load control components that are each housed within the control compartment 126.

Since the meter socket adapter 120 is connected to the generator through the junction box 138, the junction box 138 allows for a generator field connection and an optional isolation location that is located separately from the meter socket adapter 120.

Figure 18:
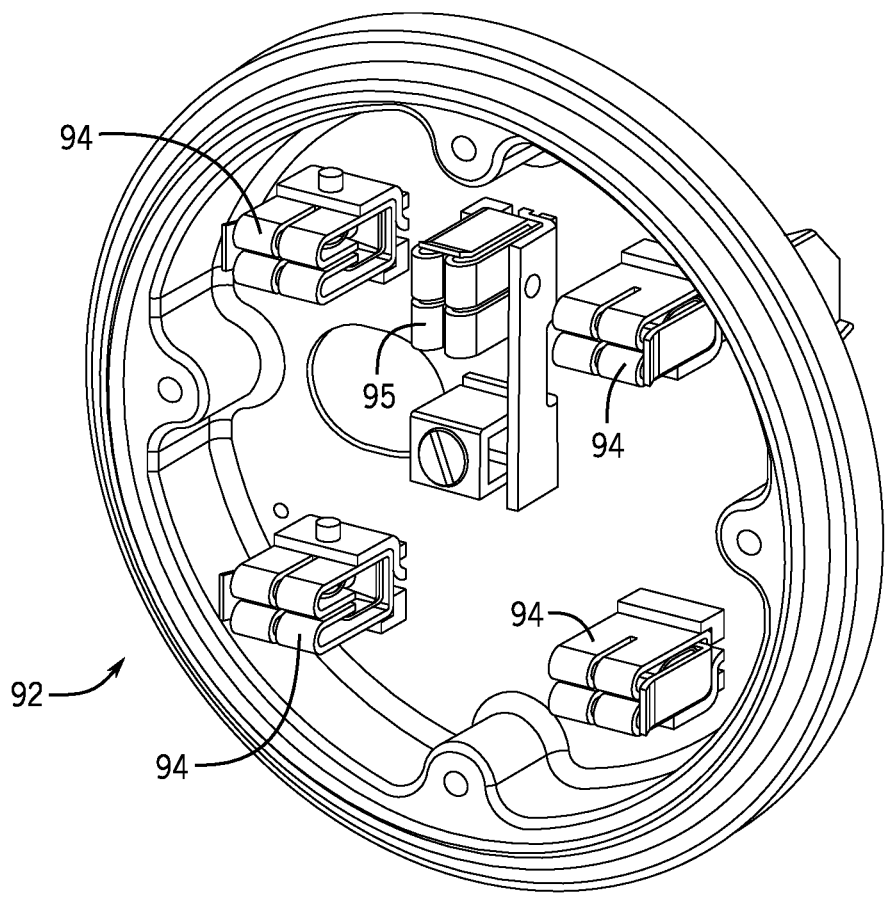
FIG. 18 is a front view of the contact adapter in accordance with the present disclosure.
Figure 19:
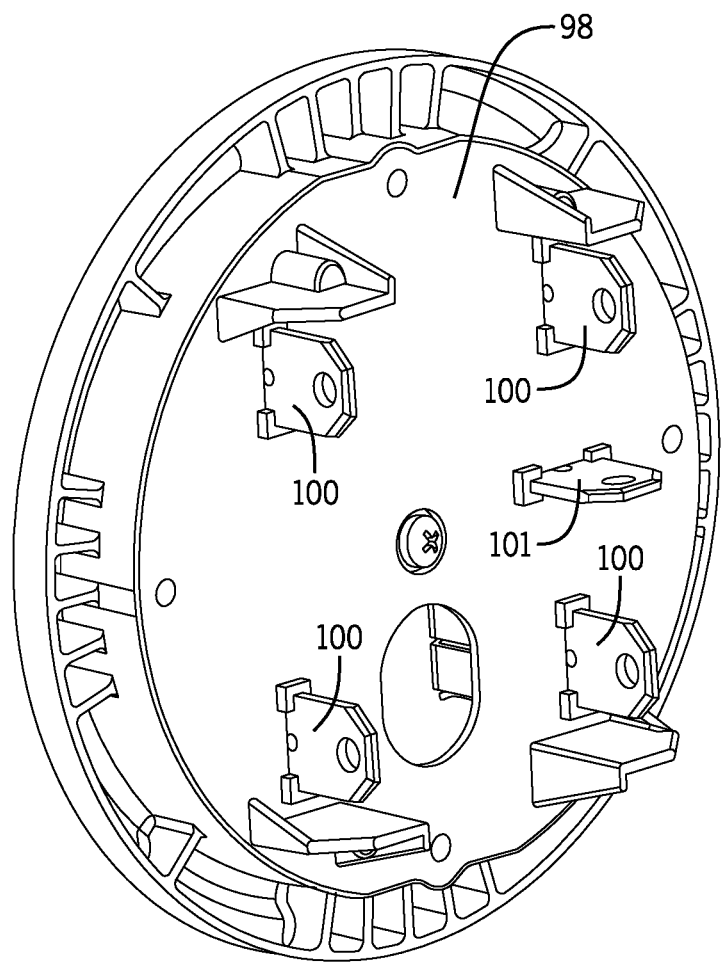
FIG. 19 is a back view of the contact adapter.

Referring now to FIG. 26, in the second embodiment, the contact adapter 92 includes a pair of neutral jaws 160 instead of the single neutral jaw 95 shown in FIG. 18. The additional neutral jaw provides a separate connection between the outer housing 122 to electrically ground the outer housing 122 and the generator housing. Thus, a neutral bonded connection does not need to be created within the meter socket adapter 120, which allows the meter socket adapter 120 to be positioned at a home without requiring complex and expensive electrical connections.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

We claim:

1. A switch assembly that connects at least a primary power source and/or a secondary power source to a plurality of electrical loads, the switch assembly being provided between an electricity meter and a meter socket, comprising:
    a housing;
    a plurality of contacts extending from the housing to be received within the meter socket;
    at least one transfer switch contained within the housing and movable between first and second positions for connecting at least the primary power source and/or the secondary power source to the plurality of electrical loads; and
    a load management controller located within the housing, wherein the load management controller selectively disconnects at least one of the electrical loads from the secondary power source while secondary power from the secondary power source is supplied to one or more other electrical loads of the plurality of electrical loads.

2. The switch assembly of claim 1 wherein the housing includes separate first and second compartments, wherein the load management controller is contained within the second compartment.

3. The switch assembly of claim 1 wherein the load management controller monitors the load on the secondary power source and selectively disconnects the at least one electrical loads from the secondary power source based upon the monitored load on the secondary power source.

4. The switch assembly of claim 1 wherein the load management controller is contained within a control board housing mounted to the housing.

5. The switch assembly of claim 4 wherein the control board housing is formed separate from the housing.

6. The switch assembly of claim 2 further comprising a front cover mounted to the housing, wherein the front cover is selectively removable to provide access to only the second compartment.

7. The switch assembly of claim 1 wherein the load management controller monitors the load on the secondary power source and selectively disconnects one or more of the electrical loads from the secondary power source based upon the monitored load on the secondary power source.

8. A switch assembly that connects at least a primary power source and/or a secondary power source to a plurality of electrical loads, the switch assembly being provided between an electricity meter and a meter socket, comprising:
    a housing defining a meter compartment and a control compartment, wherein the meter compartment and the control compartment are separated within the housing;
    a plurality of contacts extending from the meter compartment to be received within the meter socket;
    a plurality of contact jaws contained within the meter compartment and arranged to receive the electricity meter;
    at least one switch contained within the control compartment and movable between first and second positions for connecting at least the primary power source and/or the secondary power source to the plurality of electrical loads; and
    a load management controller located within the control compartment, wherein the load management controller selectively disconnects at least one of the electrical loads from the secondary power source while secondary power from the secondary power source is supplied to one or more of the electrical loads of the plurality of electrical loads;

a first front cover mounted to the housing to cover the meter compartment; and a second front cover assembly mounted to the housing to cover the control compartment, wherein the second front cover assembly is independently removable from the housing with respect to the first front cover.

9. The switch assembly of claim 8 wherein the second front cover assembly includes an outer cover and a guard.

10. The switch assembly of claim 9 wherein the second front cover assembly includes a power interrupt switch accessible upon removal of the outer cover and before removal of the guard.

11. The switch assembly of claim 9 wherein the first front cover is mounted to the housing after the electricity meter is received within the plurality of contact jaws.

12. The switch assembly of claim 11 wherein the second front cover assembly is removable to provide access to the control compartment while the electricity meter remains received within the plurality of contact jaws.

\* \* \* \* \*